US008788091B2

(12) United States Patent
Bauer

(10) Patent No.: US 8,788,091 B2
(45) Date of Patent: Jul. 22, 2014

(54) DISPENSER FOR PRODUCT PACKAGES

(75) Inventor: Jamie D. Bauer, Edgewater, NJ (US)

(73) Assignee: Giraffx Design, LLC, Edgewater, NJ (US)

( * ) Notice: Subject to any disclaimer, the term of this patent is extended or adjusted under 35 U.S.C. 154(b) by 288 days.

(21) Appl. No.: 12/904,587

(22) Filed: Oct. 14, 2010

(65) Prior Publication Data

US 2011/0087369 A1 Apr. 14, 2011

Related U.S. Application Data

(60) Provisional application No. 61/278,949, filed on Oct. 14, 2009.

(51) Int. Cl.
*G06F 17/00* (2006.01)

(52) U.S. Cl.
USPC ............ 700/242; 700/243; 700/232; 700/237

(58) Field of Classification Search
USPC .................................. 700/242–243, 232, 237
See application file for complete search history.

(56) References Cited

U.S. PATENT DOCUMENTS

| | | | | |
|---|---|---|---|---|
| 2,590,736 | A * | 3/1952 | Tandler et al. | 194/244 |
| 4,269,325 | A * | 5/1981 | Durham et al. | 221/194 |
| 4,369,897 | A * | 1/1983 | Offutt et al. | 221/227 |
| 4,887,737 | A * | 12/1989 | Adenau | 221/3 |
| 5,131,563 | A * | 7/1992 | Yablans | 221/92 |
| 5,665,304 | A * | 9/1997 | Heinen et al. | 312/71 |
| 5,813,569 | A * | 9/1998 | Cihanek | 221/150 R |
| 6,189,727 | B1 * | 2/2001 | Shoenfeld | 221/2 |
| 6,241,121 | B1 | 6/2001 | Yasaka | |
| 6,464,089 | B1 | 10/2002 | Rankin, VI | |
| 6,691,891 | B2 * | 2/2004 | Maldonado | 221/279 |
| 7,150,365 | B2 | 12/2006 | Hardy et al. | |
| 7,226,271 | B1 * | 6/2007 | Fullenkamp et al. | 414/796.8 |
| 7,533,784 | B2 * | 5/2009 | Vlastakis et al. | 221/258 |
| 7,641,072 | B1 * | 1/2010 | Vlastakis et al. | 221/123 |

(Continued)

FOREIGN PATENT DOCUMENTS

| | | | |
|---|---|---|---|
| JP | 2003265278 | A | 9/2003 |
| JP | 2006061574 | A | 3/2006 |

(Continued)

OTHER PUBLICATIONS

International Search Report and Written Opinion for PCT Appl. No. PCT/US2011/031916 Issued Nov. 24, 2011.

*Primary Examiner* — Michael K Collins
(74) *Attorney, Agent, or Firm* — Brown & Michaels, PC

(57) ABSTRACT

A modular vending and display system and a method of operation of the system, which is especially applicable to high-value and pilfer-prone products such as prestige fragrances, and to self-service shopping environments. The system enables shoppers to self-sample various scents and self-dispense fragrance product packages for later purchase. The system uses a plurality of modules which, upon actuation by a shopper, convey a package toward the shopper within individual enclosures such that only one package can be removed at a time, and then de-activate for a time delay period to prevent rapid removal of multiple packages from the module. The modules may interact, so that once a shopper has selected a product at one module in the system, other modules are also de-activated during the delay period. This reduces pilferage by making it difficult to remove more than one package during the delay period from a group of modules.

19 Claims, 30 Drawing Sheets

(56) References Cited

U.S. PATENT DOCUMENTS

| | | | | |
|---|---|---|---|---|
| 7,792,711 | B2 * | 9/2010 | Swafford et al. | 705/28 |
| 7,828,158 | B2 * | 11/2010 | Colelli et al. | 211/59.3 |
| 8,152,006 | B2 * | 4/2012 | Wamsley et al. | 211/119.003 |
| 8,260,456 | B2 * | 9/2012 | Siegel et al. | 700/244 |
| 8,448,792 | B2 * | 5/2013 | Gelardi et al. | 211/59.3 |
| 2005/0189369 | A1 * | 9/2005 | Vlastakis et al. | 221/123 |
| 2005/0279722 | A1 | 12/2005 | Ali | |
| 2006/0163180 | A1 * | 7/2006 | Rankin et al. | 211/59.3 |
| 2006/0237381 | A1 | 10/2006 | Lockwood et al. | |
| 2007/0029340 | A1 * | 2/2007 | Nagelski et al. | 221/268 |
| 2007/0273513 | A1 * | 11/2007 | White | 340/568.8 |
| 2008/0245811 | A1 * | 10/2008 | Colelli et al. | 221/90 |
| 2009/0248198 | A1 * | 10/2009 | Siegel et al. | 700/231 |
| 2009/0321373 | A1 * | 12/2009 | Hardy | 211/59.3 |

FOREIGN PATENT DOCUMENTS

| | | | |
|---|---|---|---|
| WO | 0143598 | A1 | 6/2001 |
| WO | 2007020725 | A1 | 2/2007 |
| WO | 2007085211 | A1 | 8/2007 |

* cited by examiner

DISPENSER FOR PRODUCT PACKAGES

REFERENCE TO RELATED APPLICATIONS

This application claims one or more inventions which were disclosed in Provisional Application No. 61/278,949, filed Oct. 14, 2009, entitled "Dispenser for Product Packages". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of pilfer-resistant dispensing. More particularly, the invention pertains to methods and apparatus for dispensing products in packages.

2. Description of Related Art

Currently there are a number of types of product merchandizing and/or dispensing displays. One of the basic methods of displaying products for sale consists of traditional shelves on which individual products are openly placed. This arrangement is found in most retail stores; including stores generally referred to as mass merchant discounters and in particular, chain drug stores and grocery stores. Typically the products are placed on the shelves openly, without protection(s) from pilferage of any kind. This open display arrangement is especially important at mass merchant type retailers because they have only a limited number of store associates present to provide product information and shopping assistance and therefore rely heavily on self-service shopping.

There are also a number of types of product dispensers and/or vending machines which display a multiplicity of products for viewing within a large enclosing housing, having frequently a clear glass or plastic façade, thereby preventing pilferage of the products prior to vending. However, such vending machines create a barrier between shoppers and the products rendering impossible the experience of interacting with and/or sampling a product, such as a fragrance, prior to dispensing the package. In the specific category of self-service shopping for high value, prestige fragrance products, such barrier creates a negative shopping experience for shoppers and a negative selling experience for retailers. Most such fragrances are sold in department type stores and fragrance specialty retailers, both of which provide individual sampling experiences and human assistance and product interaction prior to the sale. That positive shopping experience, which leads to most sales of prestige fragrances throughout the world, is what the present invention recreates at mass merchant retailers, where such interactive shopping experience is generally unavailable.

There are also currently a number of display and vending devices for testing, samples and sampling, such as with fragrances, but they do not combine in the same system with any device or method for self-service vending of the actual products therewith associated. There is therefore no direct and contiguous method for a shopper to sample, select and purchase in a one-stop operation at a self-service shopping environment.

As shown in FIG. 1, in the specific case of high value, prestige fragrance packages, which require pilferage protection(s) such as when currently sold at mass merchant discounters and the like, they are usually placed on shelves 2 inside a steel and/or wooden display case 1 enclosed behind glass doors 3 secured with a lock 4. This viewable display arrangement provides a secure, anti-pilferage environment for the products, but is detrimental in the extreme to every other aspect of the mass market retailers' and shoppers' experiences with display and sales of fragrance products. While the locked display case provides a secure environment for the prestige fragrances, it makes self-service shopping impossible thereby severely impeding sales at all such retailers which rely heavily on self-service shopping. It also provides no useful method whatever for shoppers to sample the fragrances, a function shown to be a necessary and integral part of the successful fragrance shopping and selling experience. It also requires a great deal of expensive and time consuming manual labor by retail associates to open the cabinets for and perform the various functions of assisting shoppers and checking and restocking inventory.

Market research and common sense show that successful thievery requires quick, deft, and concealed actions, and that the longer a thief must interact with a display of products in a self-service environment to steal one or more products, the more likely the thief is to be either discouraged or caught in the act. While the opposite is true of shoppers—the longer a shopper is enticed to interact with a display of products for sale, the more likely that a sale will be made. Hence the usefulness of a controlled system which combines semi-open-sell, or self-service sampling and shopping with a method with device of vending the products in a one-at-a-time manner with a built in pilfer-resistance time delay period between such vendings.

SUMMARY OF THE INVENTION

The present invention provides a modular vending and display system for retail merchandizing, which is especially applicable to high-value and pilfer-prone products such as prestige fragrances. When used for such fragrance vending, the display enables shoppers to self-sample various scents and self-dispense fragrance product packages for later purchase. The invention includes a multiplicity of programmable, electro-mechanical modules which, upon actuation by a shopper, forwardly convey a package toward the shopper within individual enclosures such that only one package can be removed at a time. The modules may interact and be programmed with time delays which reduce pilferage by making it difficult to vend more than one package at a time from a group of modules.

DETAILED DESCRIPTION OF THE INVENTION

While the embodiments of the invention below will be described primarily in terms of "fragrances", it will be understood that the method and apparatus of the invention is applicable to display and dispensing of packages which may otherwise be a target for thieves, for example but not limitation, prestige fragrances, OTC medications and health aids, or electronics and technology. Additionally, the sampling module could be used instead for Pre-Sales Info Brochures, Instant Savings Coupons or Rebate Forms, or Patient Info Cards (in the case of OTC meds and health aids). The principal market for the invention would be high value products which are of sufficient value to be a target for thieves, although it is not intended to limit the invention to such products.

The present invention is a package display, dispensing and sampling system which enables an interactive shopping experience for a shopper without additional retailer assistance. It provides a means for sampling or retrieving information sheets about various products, such as fragrances, prior to making a purchase decision. It further enables shoppers to self-select packages for future purchase while simultaneously inhibiting bulk pilferage of the packages by dishonest persons.

The present invention presents a variety of modules and modular subassemblies which can be installed within the outer housing of display cases currently found at retail stores, replacing and eliminating the existing shelves and lockable glass doors thereof. It may also be installed within a custom designed and manufactured housing created specifically for the system of the present invention. When fully assembled and installed, said modules and subassemblies integrate to create the completed display and dispensing system of the present invention.

The invention also presents a method of sampling and vending products using the apparatus of the invention.

The Vending Modules and System

Figure 1:
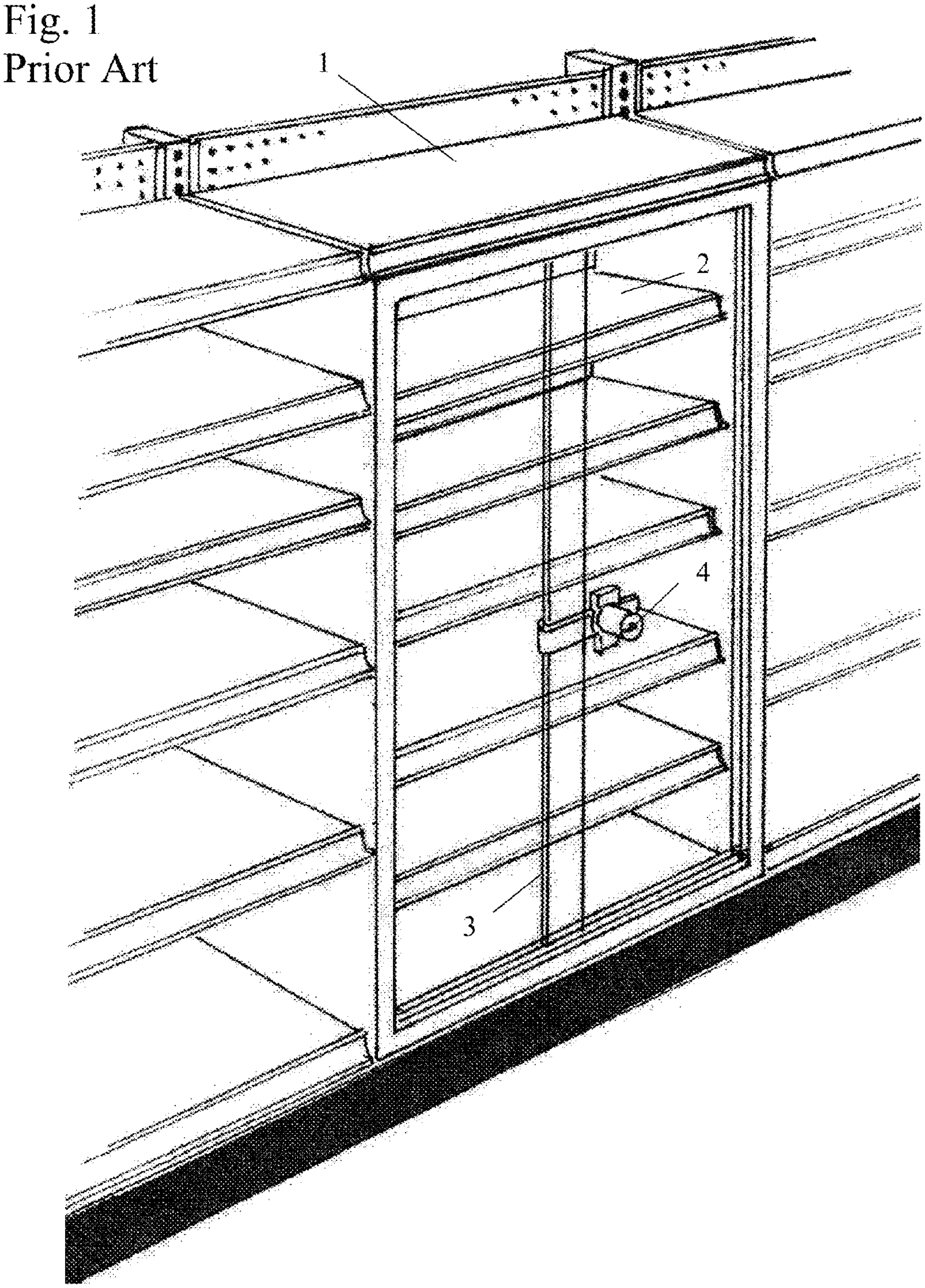
Fig. 1 Prior Art
FIG. 1 shows a view of a prior-art fragrance display cabinet.
Figure 2:
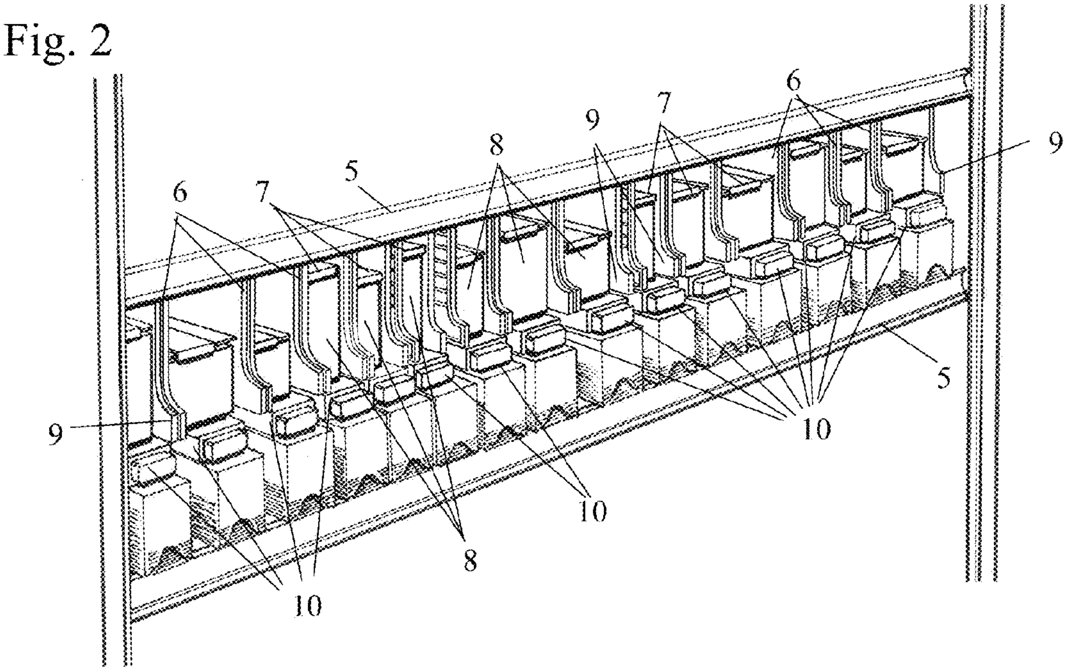
FIG. 2 shows a perspective view of a single shelf assembly of the modules of the invention.
Figure 4:
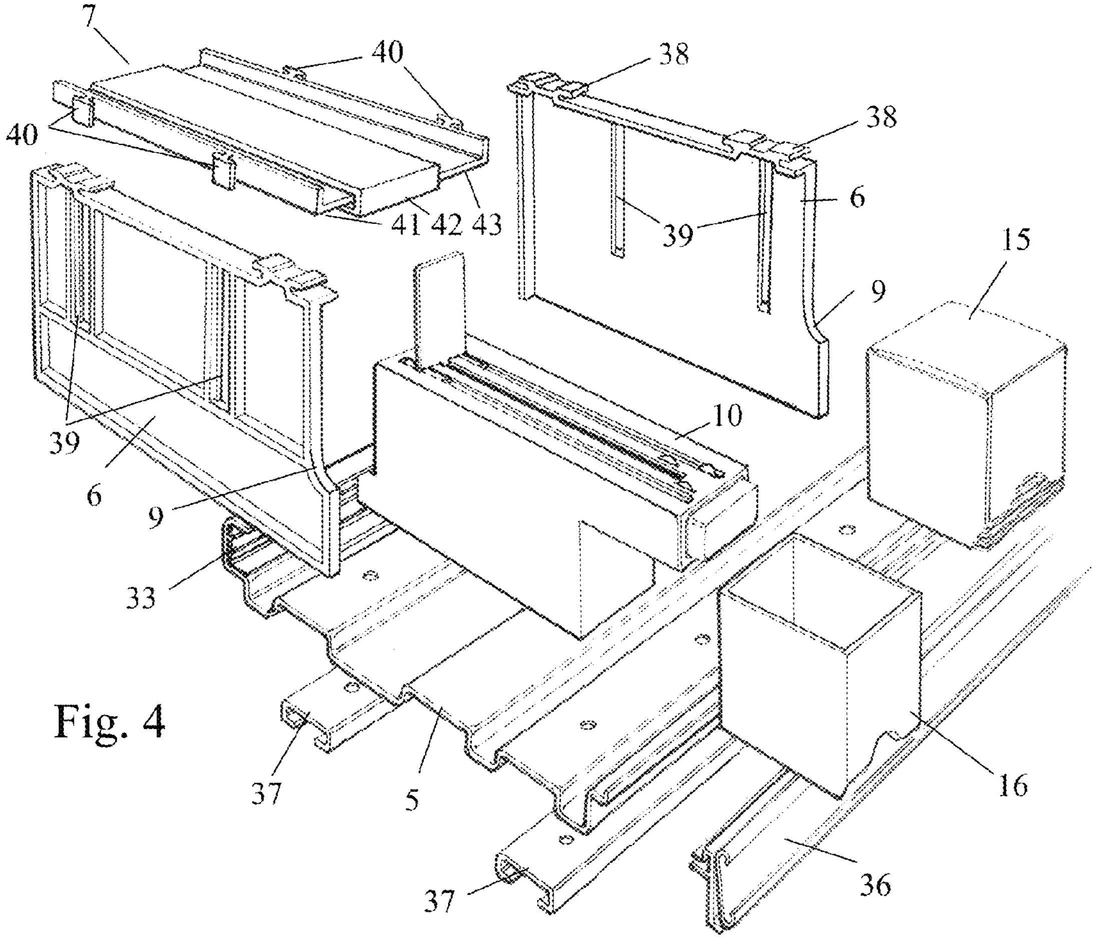
FIG. 4 shows a partially exploded perspective view of a module assembly and shelf portion.
Figure 5:
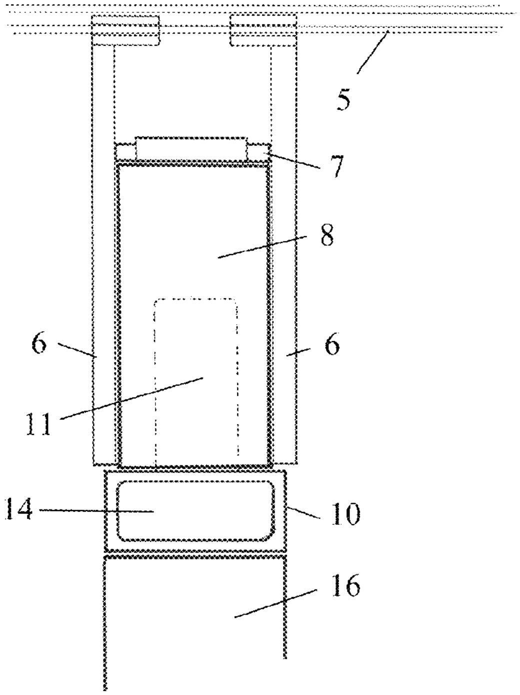
FIG. 5 shows a partial front view of a module assembly.
Figure 6:
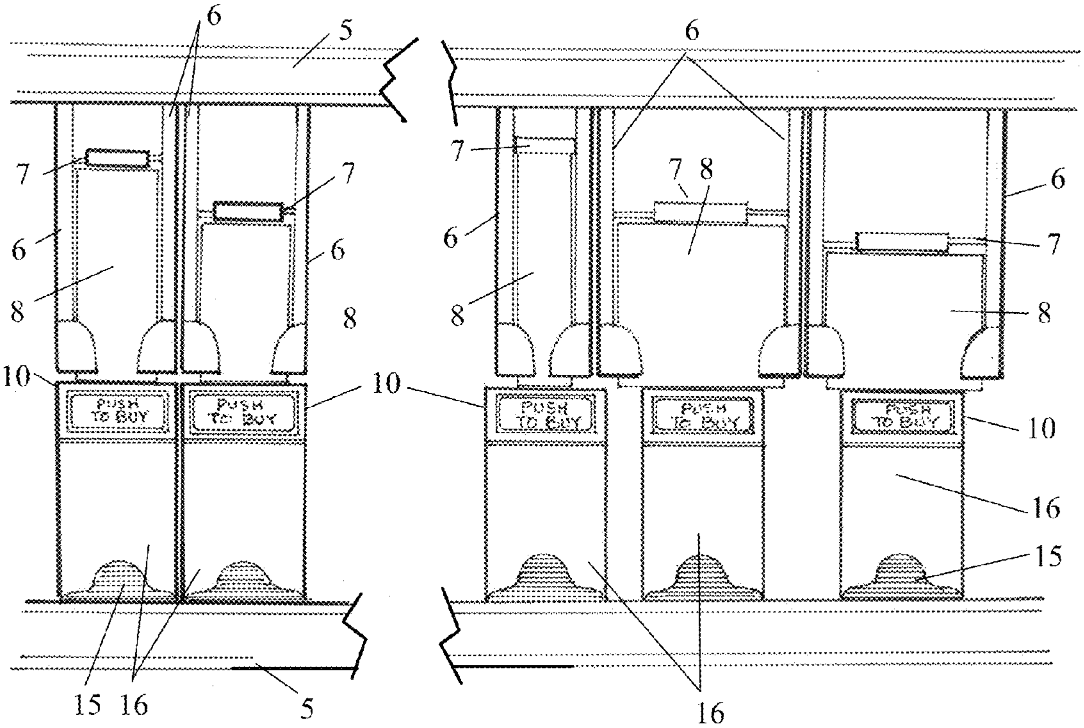
FIG. 6 shows a section of a shelf assembly, showing the adjustable widths of the row dividers.
Figure 11A:
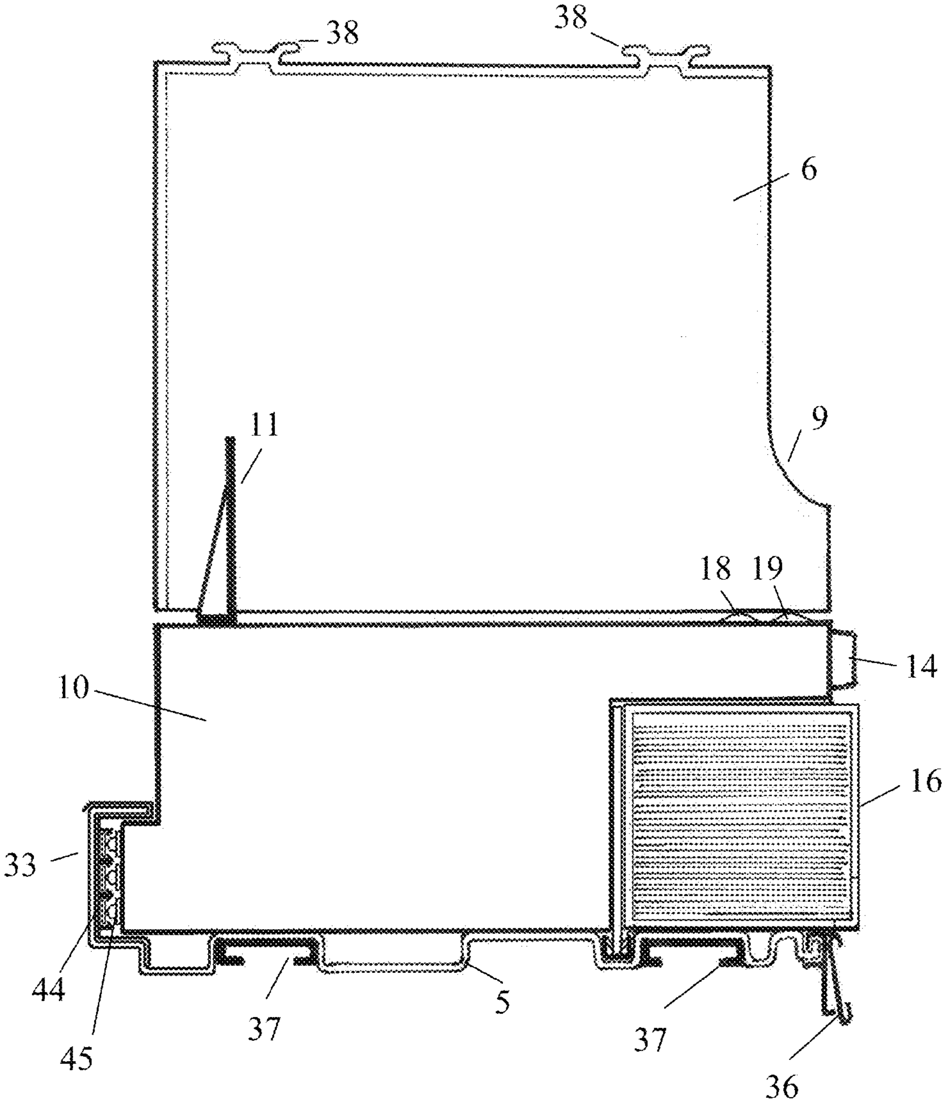
FIGS. 11A and 11B show side views of one module assembly and two module assemblies assembled on shelves, respectively.
Figure 11B:
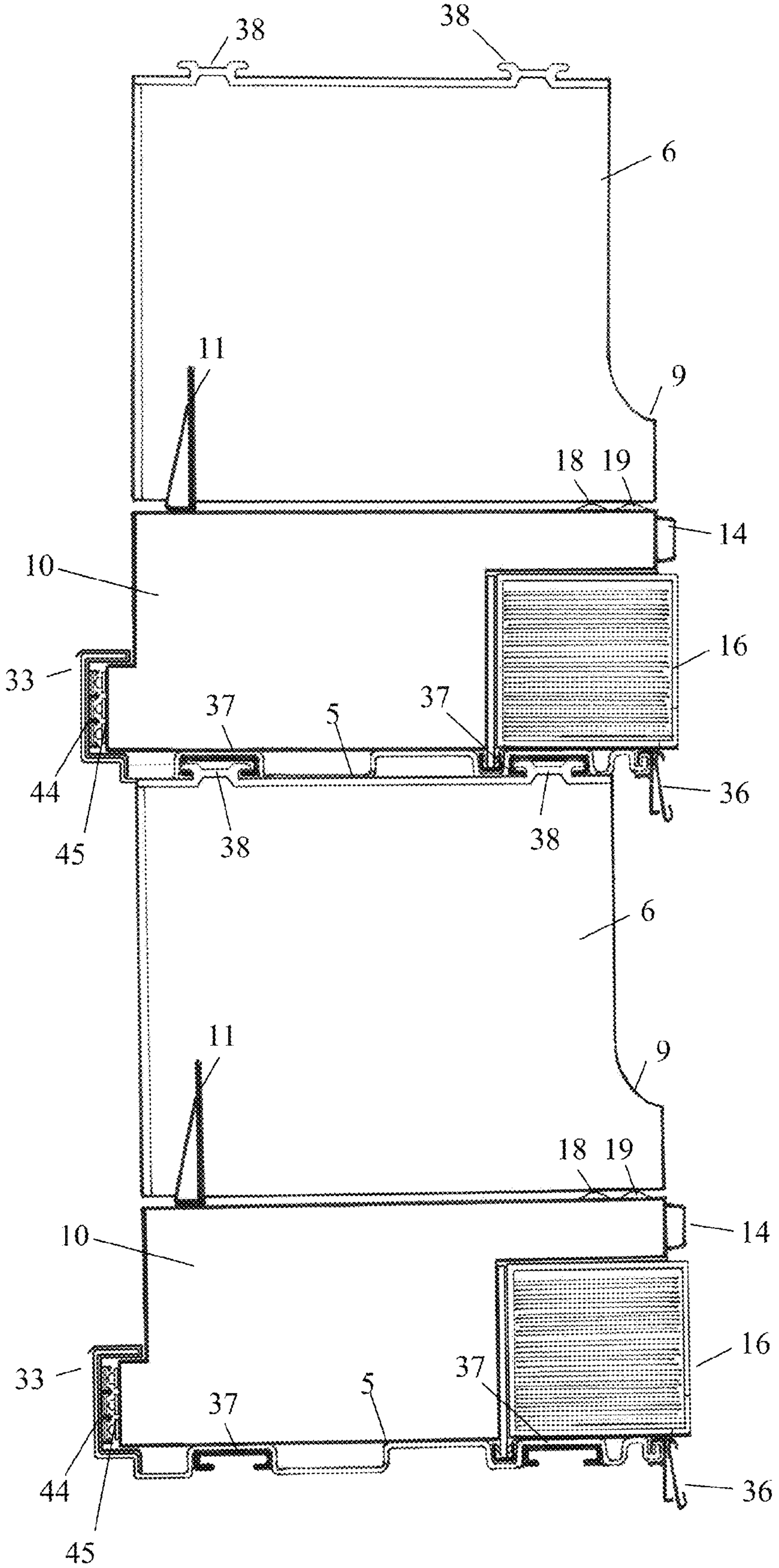

FIG. 2 shows a perspective view, and FIGS. 5 and 6 show a front view, of a row of vending modules of the invention, as they might be deployed in a store. FIG. 4 shows an exploded view of a single module with its surrounding shelf and enclosure, and FIGS. 11A and 11B show side views of one module and of two modules on different shelves, respectively.

The basic module assembly of the invention is made up of a conveyor module 10 and an associated sample module 16, which preferably fits in a recess 24 in the front of the conveyor module 10.

An important feature of the invention's pilfer-resistant capabilities, while displaying, merchandising and dispensing the products 8, is the size adjustable, enclosing tunnel around each column of product packages. This enclosure is important because it prevents the packages from being removed en masse by a pilferer and makes it possible for the combined design of the enclosure and the actions of the electro-mechanical conveyor modules to dispense only one package 8 at a time, while protecting the others in the system from easy removal.

The bottom of that enclosure is created by the top surface of the conveyor module 10, on which each column of product packages rest and along which they are conveyed. The conveyor modules 10 may be manufactured (and made available in the overall assembly) in one or more standard widths. For example, there could be two widths—a narrower one to accommodate packages from 1" to 3" wide and a wider one for packages wider than 3", to both accommodate and provide a stable resting and conveyance surface for a variety of package widths.

The left and right walls of each column's enclosure are created by its slidably adjustable row dividers 6. These row dividers 6 insert into sliding tracks 37 on the underside of the support shelf above 5 and hang downwardly therefrom toward the conveyor modules 10 supported on the shelf 5 below. They provide snug left-to-right enclosing walls between which the product packages 8 are housed and conveyed. They both attach and are slidably adjustable by any ordinary means known to persons skilled in the art, for example by keys 38 as shown in FIG. 4.

The shape and design details of the row dividers 6 are important to the proper dispensing and pilfer-resistance capabilities of the conveyor modules, as well as to their proper connections with the roof panels, described below. They must be of an overall height to hang downwardly from the underside of the shelf above to a point just clearing the upper surfaces of the conveyor modules 10 below. This both provides for a good enclosure and allows the row dividers to slide throughout the assembly of the system without interferences, thereby allowing for future product plan resets.

Further, the dividers 6 must be of an overall front-to-rear depth and/or shape to both completely enclose the column of product packages therebetween while at rest in the "Queue" position and not enclose the frontmost package after it has been advanced by the conveyor module to the "Select" position. This enclosure disengagement allows for a shopper to access a small "grabbable" portion of said frontmost package, thereby enabling its self-service removal by a shopper. This is accomplished by a lower front portion 9 of the row divider 6 continuing all the way to the leading edge of the conveyor module 10, to continue guidance of the advanced packages, while the upper portion of the front of the row dividers is cutaway to expose an advanced frontmost package 8 for grabbing by a shopper.

Figure 10A:
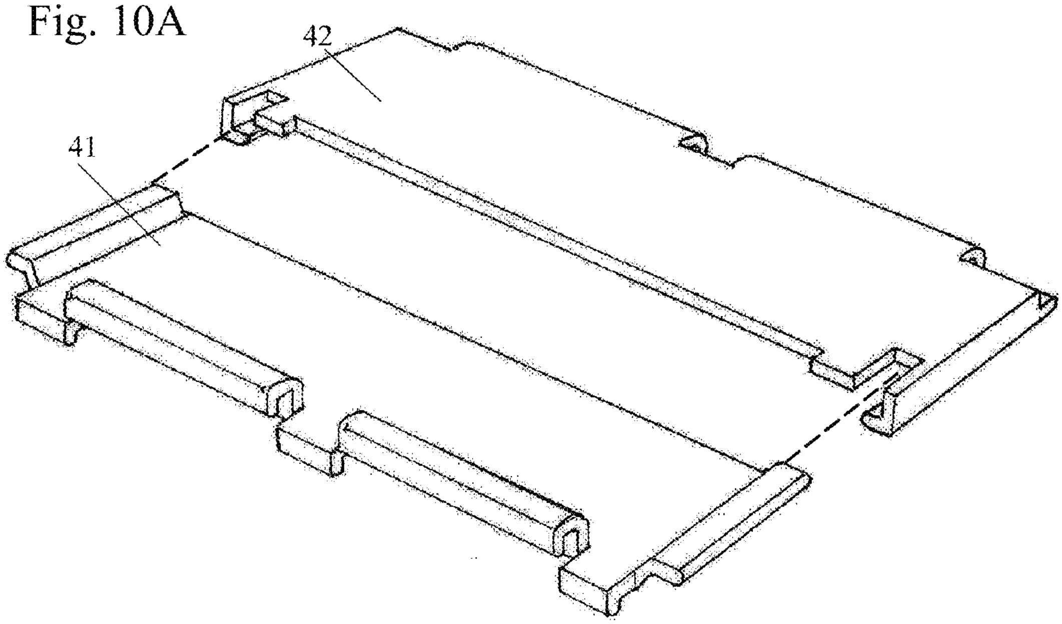
FIGS. 10A-10C show views of roof panels.
Figure 10B:
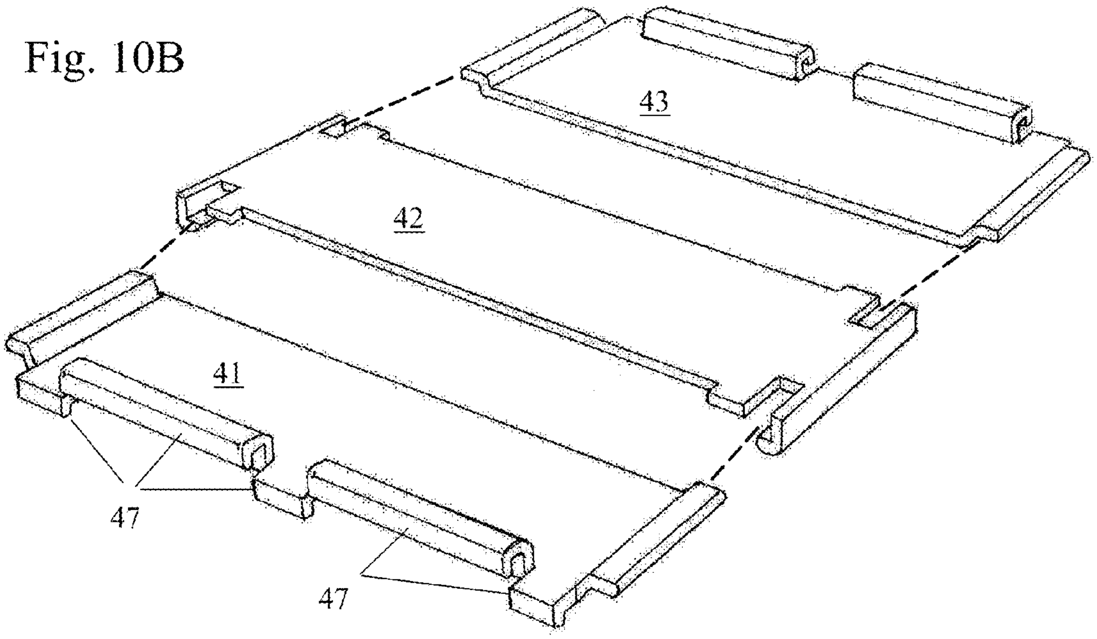
Figure 10C:
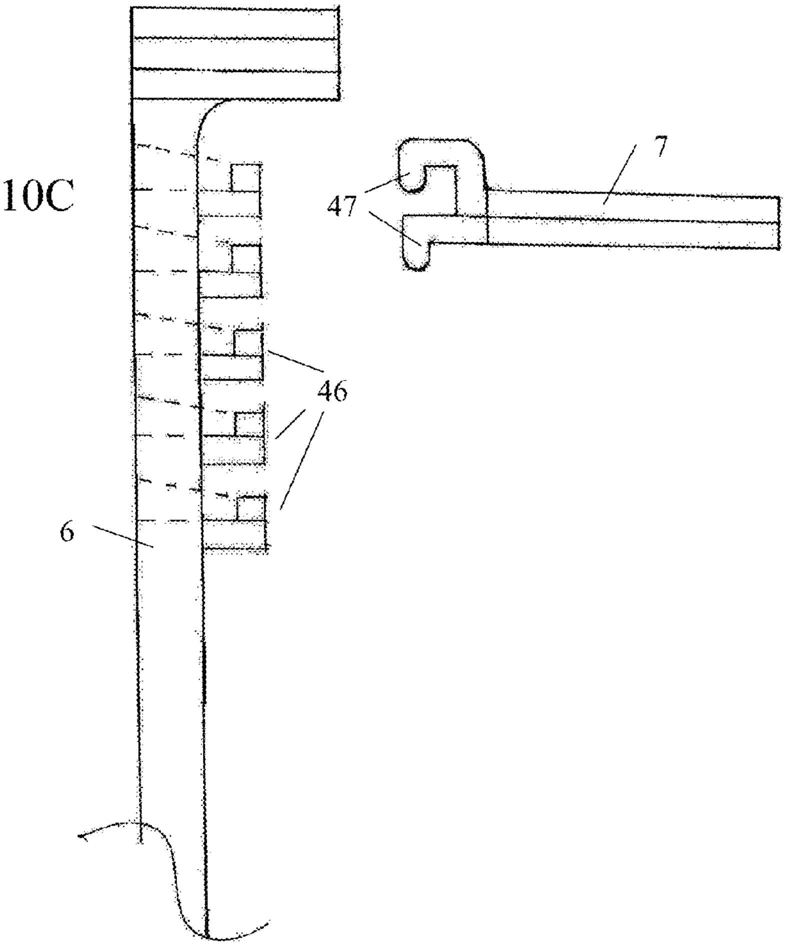

The top surface of the enclosure is provided by a width and height adjustable roof panel 7. The width adjustability is to accommodate a column containing a variety of package widths, as described above, between the row dividers 6. The roof panel design and assembly both width adjusts and attaches to the row dividers by any of a number of means known to persons skilled in the art. The width of the roof panels 7 may be accomplished, as shown in FIGS. 10A and 10B, by splitting the divider into two parts 41 and 43, held together in a center section 42. The height adjustability is to contain a variety of product package heights, which may vary between (approximately) 3" and 7" tall, which may be done, for example, as shown in FIG. 4, by keys 40 riding in slots 39 in the row dividers 6. Or, as shown in FIGS. 10B and 10C, there may be a number of horizontal tracks 46 on the insides of the row dividers 6, into which side hooks 47 on the roof panels 7 can rest. It is important that the roof panel 7 both fill the adjusted width between its left and right row dividers 6 and rest lightly upon the top surfaces of the product packages 8 in the entire column therein. Otherwise it may be possible for a dishonest person to insert a tool of some sort to remove a multiplicity of packages from a column in a single motion, thereby defeating the pilfer-resistance feature.

The individual electro-mechanical vending modules insert into a housing of the overall system, which is in the form of a supporting shelf 5, which attaches by any ordinary means to existing store fixtures, or which can be mounted within custom-made cabinetry by means known to the art. The shelf will be sufficiently structural as to support the significant load of itself, the set of modules thereon and a complement of the product packages loaded thereon, for example, but not by limitation, a formed steel shelf. It may also be a combination of assembled materials such as, but not by limitation, a formed steel shelf having molded parts of other materials inserted therein, such as, but not limited to, plastic or aluminum extrusions.

FIG. 4 shows, among other features, an exploded view of an embodiment of shelving for use with the modules of the invention. The shelf 5 can be made of stamped or roll-formed steel, having latitudinally disposed channels, above and below, which provide unflexing support for the weight the shelf must hold. Channels are provided for the slidable insertion and attachment of the conveyor modules 10, the sample modules 16, the power/data bus 33, the various row divider tracks and panels 6, and any desired façade panel (not shown). An add-on extrusion 36 for pricing or scanning tags such as currently found in grocery store shelving may be provided.

The bottom surface of said shelves will be likewise formed as the top surface, having structural channeling which provides strength, support and straightness, and channeling 37 which accepts the slidable insertion of left-to-right adjustable/movable row dividers 6.

Figure 3:
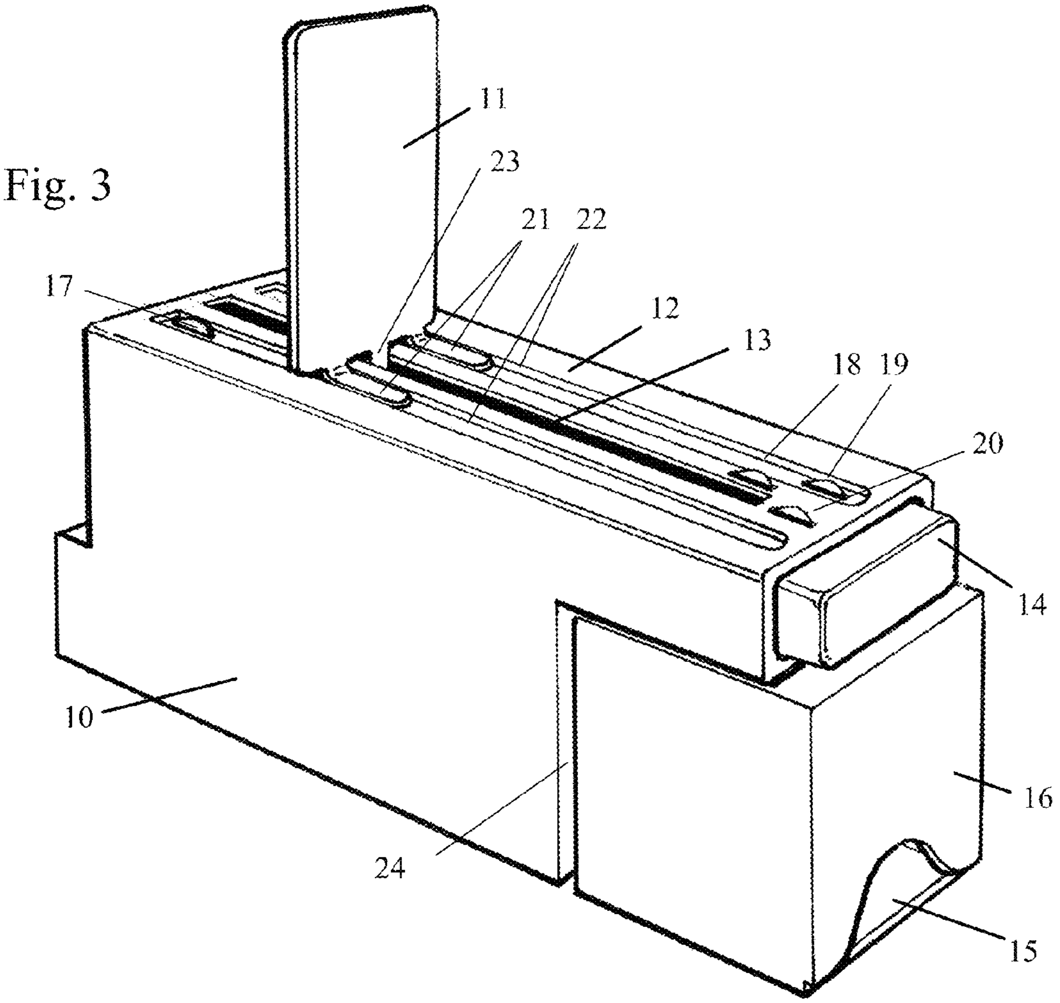
FIG. 3 shows a perspective view of a single module assembly, without the side walls and top.

The conveyor module 10 supports a row of product packages on its top surface 12 and moves them forward as required. The packages can be moved by a pusher 11, as shown in the figures. It will be understood that, as used herein, the term "pusher" is intended to include not just moving plates as shown in the drawings, but also other designs and other means for moving the packages—for example, the upper surface of the conveyor module could be a flexible belt, with or without protruding "pushers", or some other arrangement to controllably move the packages could be provided within the meaning of the term "pusher" as used herein. In the embodiment shown in FIG. 3, the pusher 11 has stabilizing feet 21 riding on grooves or tracks 22 on the surface 12, and an actuator in the form of a lever or arm 23 extending into the interior of the module 10 through a slot 13.

A rear position sensor 17 and a forward position pusher sensor 19 are located in the track 22, in order to sense when the pusher 11 has been moved to its rearmost or frontmost positions, respectively. A queue position sensor 18 is provided in the top surface 12 to sense when a product package is present at the queue position, as will be described in more detail below. Similarly, a selection position sensor 20 is provided on the top surface 12 to sense when a product package is present at the forward "selection" position.

Figure 7A:
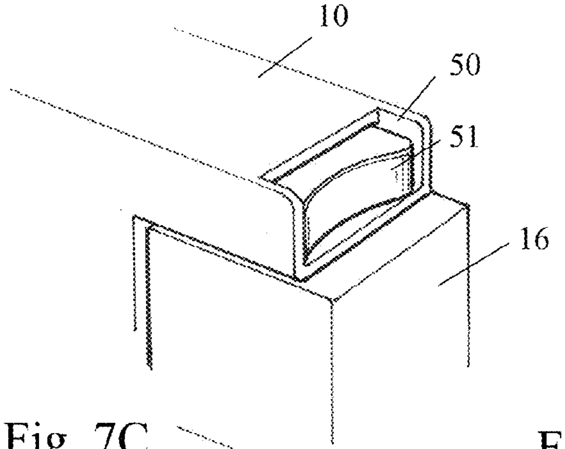
FIGS. 7A-7D show variations on the buttons used for the selection input.
Figure 7B:
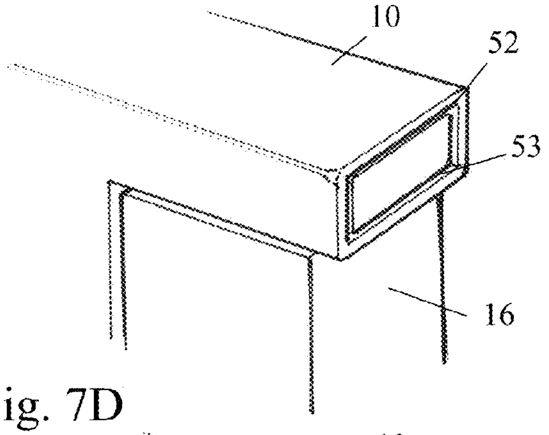
Figure 7C:
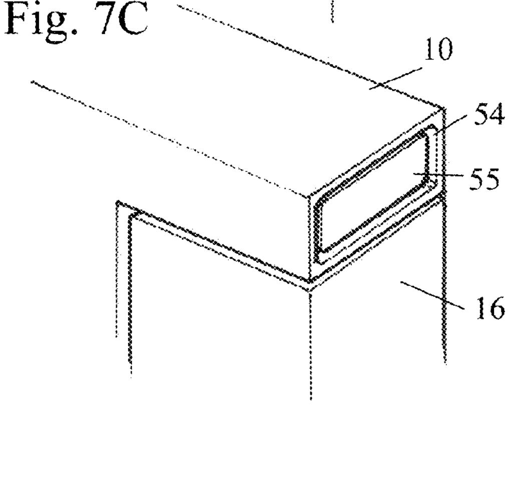
Figure 7D:
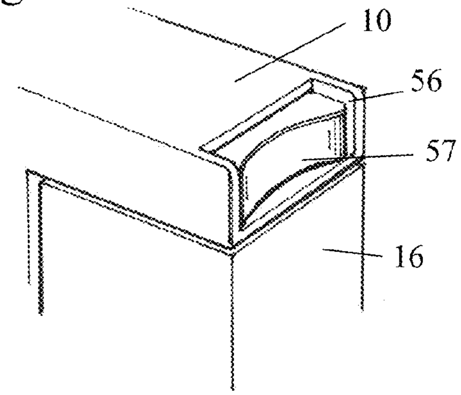

A "push to buy" button 14 on the front of conveyor module 10 acts as a selection input, allowing a shopper to activate the module, as will be described in detail below. FIG. 7 shows four different possible designs for the "push to buy" buttons. Buttons 50 and 56 have curved front surfaces, while buttons 52 and 54 are flat. Preferably, as shown in FIGS. 7B and 7C, the buttons 52 and 54 will be recessed within some form of framing bezel 53 and 55. In FIGS. 7A and 7D, the top of the module is cut back to form a recess 51 and 57 in which buttons 50 and 56 are mounted. The various designs are intended to address the problem of accidental actuations by purses and shopping carts and such. The buttons shown are some concepts which might be appropriate for that purpose, but it will be understood that other designs will work within the teachings of the invention. Buttons may be illuminated, as mentioned below.

Figure 14:
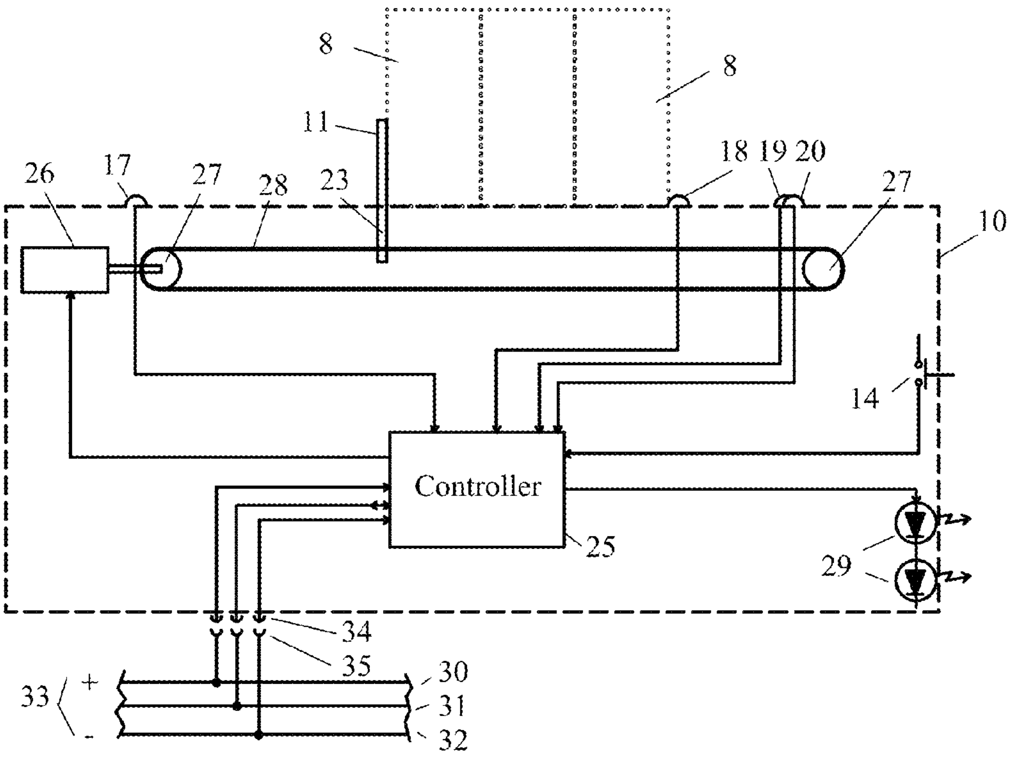
FIG. 14 shows a block diagram of a conveying module of the invention.

As can be seen in the block diagram of FIG. 14, the conveyor module 10 also encloses a controller 25, preferably microprocessor-based, and an electromechanical drive mechanism to move the pusher 11. The drive mechanism is here shown as motor 26 driving a belt 28 running between a pair of pulleys 27, with the pusher 11 actuator 23 coupled to one side of the belt—but it will be understood that other methods of moving the pusher 11 are possible within the teachings of the invention. For example, the belt 28 could be a chain run by sprockets, or the actuator 23 could couple to a threaded nut which runs on a threaded screw driven by motor 26, or the pusher 11 could be mounted to the upper surface of a belt running between a pair of axles, which both supports and moves the packages 8. Other arrangements are possible within the teachings of the invention. The controller 25 electrically controls the motor 26 to move the pusher 11 as needed.

The sensors 17, 18, 19 and 20 are coupled to the controller 25, as is the "push to buy" button 14. A light or lights, here shown as a pair of LED's 29, can be provided as indicators of module status. The lights 29 can be built into the "push to buy" button 14, or can be separate, as desired. If desired, the lights 29 can be individually controllable or can be of different colors for different functions. For example, one light can be used as described in the method, below, to indicate "ready" or "empty" status, and another, different colored light could light if the controller 25 detects an error or problem situation with the module. Alternatively, a tri-color LED could be activated by the controller 25 to light up green for "ready", yellow for "nearly empty", off for "empty" and red for "error".

The controller 25 can control the motor 26 to move the pusher 11 to its rearmost position, where it contacts sensor 17, which will signal the controller 25 to cease further rearward movement. Product packages 8 can then be put on top of the module 10. The controller 25 can then control the motor 26 to move the pusher 11 forward until sensor 18 detects a product package 8 at the queue position. The motor 26 will then be stopped, and the module 10 is ready to vend.

When the "push to buy" button 14 is pushed, the controller 25 can control the motor 26 to advance the pusher 11 until sensor 20 detects that a package is in the forward selection position. If there is no product on the module 10 when the pusher 11 is moved forward, the pusher 11 will be moved by the motor 26 until it contacts sensor 19 at the frontmost empty position, which will signal the controller 25 to stop the motor 26 and, if desired, use the lights 29 to signal that the module is empty. These steps in operation will be described in more detail in the description of the method, below.

The controller 25 is supplied with power from power lines 30 and 32 on a bus 33, which, in the embodiment shown in the figures, runs along the back of the shelf 5. Preferably, the power is supplied at a low voltage—generally 24 volts or less—for safety reasons. While DC power is shown by the + and – indications in the drawing, it will be understood by one skilled in the art that AC power can easily be used as desired.

Figure 13:
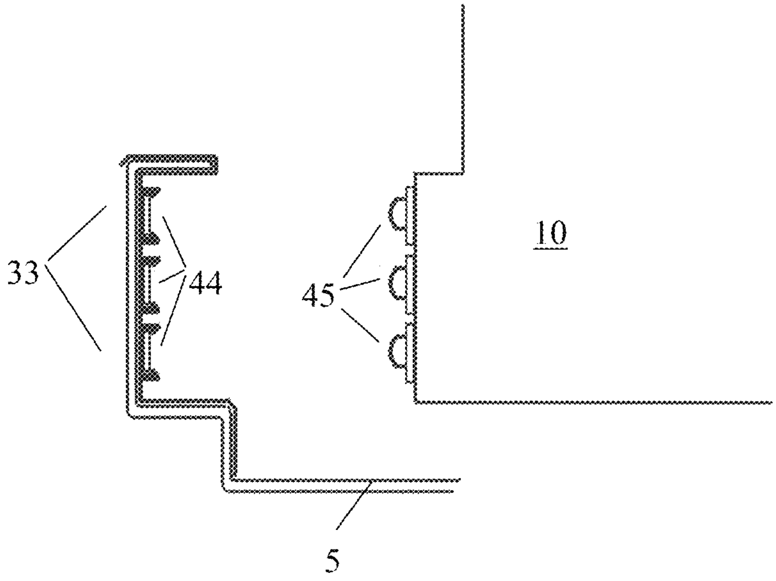
FIG. 13 shows a detail of the connection between the module and a power track.

A connector 34 on the module 10 contacts a mating bus connector 35 on the bus 33, which can be any sort of module/bus connection known to the art. In a preferred embodiment, as shown in FIG. 13, the module connector 34 and bus connector 35 interact in the manner of a track light—the track connector 35 being in the form of linear contact lines 44 which are contacted by pins 45 on the module 10 when the module is slid to the back of the shelf 5.

Using this arrangement, modules 10 can be located anywhere along the shelf 5. Alternatively, conventional multipin or edge sockets could be mounted on the shelf mating with plugs or edge connectors on the modules, or cables could be run to each module, however both of these alternatives present restrictions on the number and position of modules.

In the embodiment shown in the drawings, in addition to power lines 30 and 32, there is also at least one bi-directional data line 31 in the bus 33. This allows for inter-module communication, as will be explained in greater detail below. In a preferred embodiment, the controller 25 in each module 10 would be programmed to monitor the data line 31 and also disable the "push to buy" button 14 when a condition is detected on data line 31. This condition could be as simple as returning the data line 31 to ground, so that all modules connected to the bus can be simultaneously locked against vending product simply by grounding data line 31. The condition on the data line 31 could be more complex, if desired, for example a predetermined digital signal for initiating the disabling of the button.

In accordance with a method of the invention, when a module 10 disables the "push to buy" button 14 during a delay period (see the explanation of the method, below, especially with regard to FIG. 12H), data line 31 is grounded. Thus, when that module is locked out, all of the other modules connected to the same data line would also stop vending, so that a person could not defeat the anti-pilfering delay by passing down the line of modules, taking one product from each one. The data lines from all of the shelves in a display area can be connected together, so that all of the modules in the entire area can be controlled together. The same technique could be used to manually disable all of the modules in a section by providing a manual grounding switch on the data line, if desired.

Additional bus lines could also be provided for other communications functions known to the art, such as enabling/disabling the modules remotely, reporting the operation of the modules, sending indications of empty modules to a remote location, etc.

The sample module 16 houses samples of the product (for example, sachets of fragrance), preferably as a stack of sealed packets in a sampling cartridge 15. A slot in the sample module 16 permits removal of a sample packet, so that a customer can try the product. For vending products such as fragrances or the like, the packets are preferably openable, thin, foil pouches containing alternately either a few drops of actual liquid or gel fragrance for deposition on the shoppers' skin, or liquid fragrance moistened towelettes which may be rubbed on the skin. Other embodiments are possible including, but not limited to, a variety of "puffer" type scent distribution devices such as those used within air fresheners, or spray bottle dispensers which actuate a fine spray of fragrance mist upon depression of a plunger or similar push button. For vending non-scent products as, for example, small electronic music players or pocket cameras, the sample module 16 could provide specification sheets or sample photos, coupons, or any other customer-attractive adjunct as might be desired.

Preferably, the sample cartridge 15 in the sample module 16 would contain sufficient quantity to last, unattended, for an extended period, such as a few days, up to a week or two weeks depending on usage (though other timelines are possible). For the sample module to be easily restocked/reloaded by retail store associates when empty or near to empty, in the preferred embodiment the sample cartridge 15 would be a cardboard or paper carton pre-filled with a bulk quantity of sample packets (100 as an example, though other quantities are possible) would be simply removed from the sample module 16 when empty and replaced with a new, full cartridge 15 of packets.

Figure 8A:
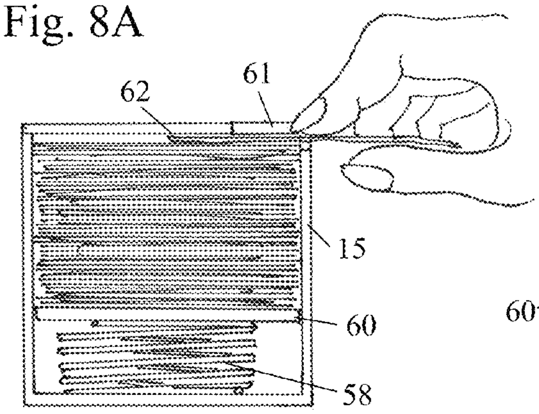
FIGS. 8A-8D show cut-away views of four embodiments of the sample module of the invention.
Figure 8B:
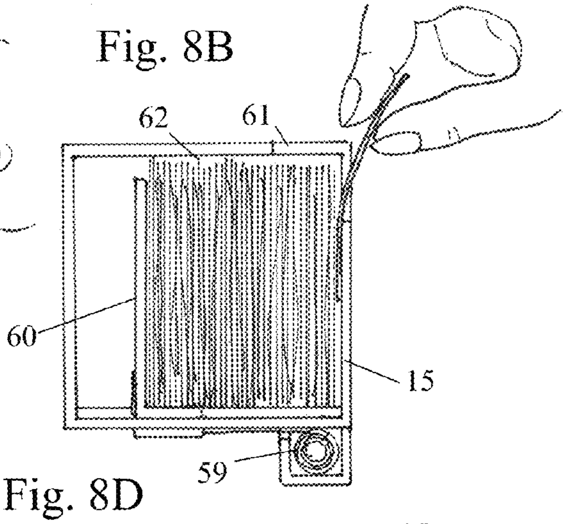
Figure 8C:
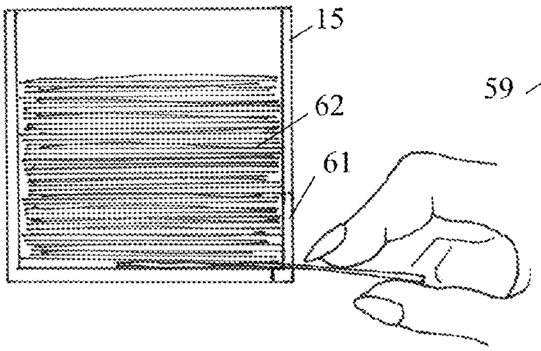
Figure 8D:
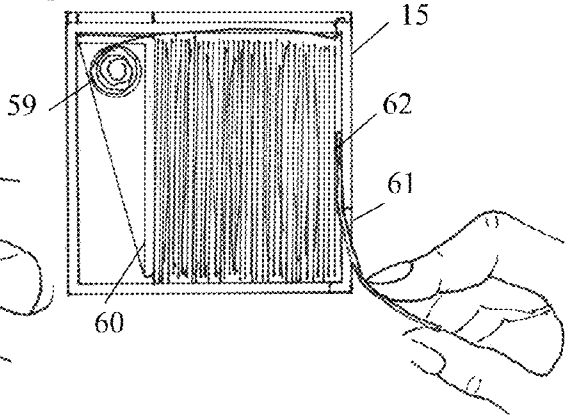
Figure 9:
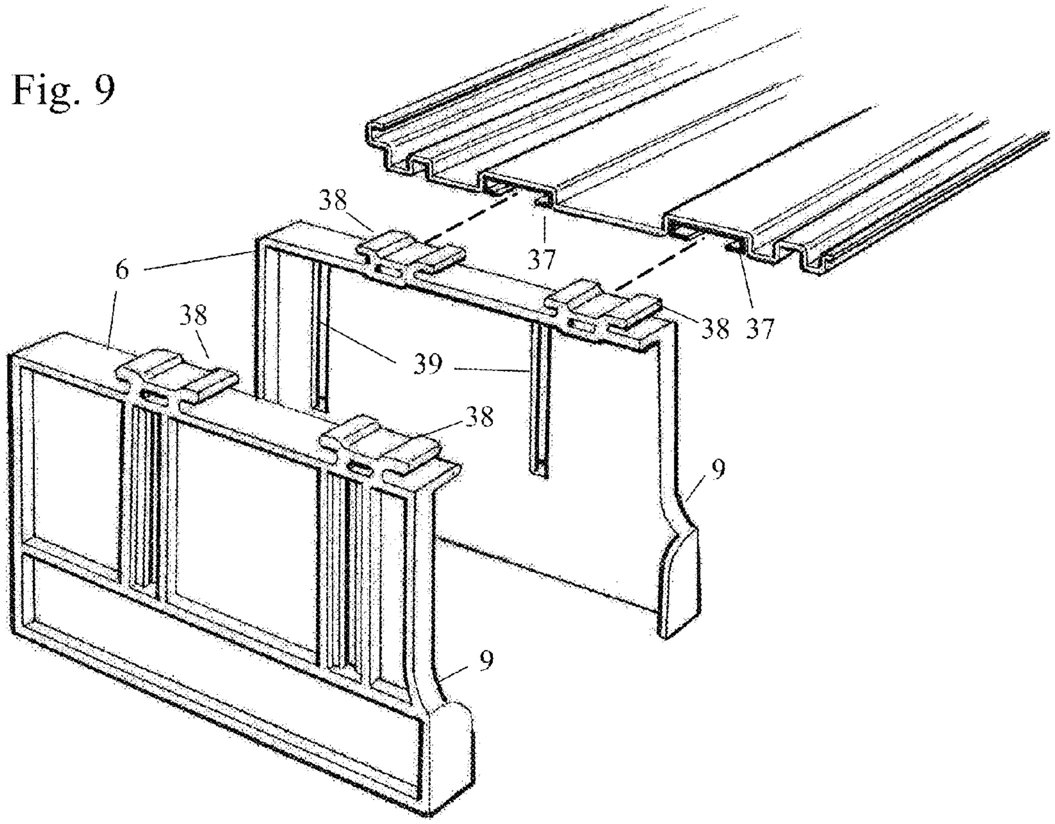
FIG. 9 shows a partial perspective view of the row divider to track channel assembly.

FIGS. 8A through 8D show four different embodiments of sample cartridges 15, as might be used within the teachings of the invention. It will be understood that similar designs could be used for module 16, if it was desirable to eliminate the separate module 16 and cartridge 15 of the preferred embodiment, and instead have samples 62 manually inserted into the module 16. FIG. 8C is essentially the design of the preferred sample cartridge 15, in which samples 62 gravity feed and are pulled out through an aperture 61 in the bottom-front of the cartridge 15. In FIG. 8A samples 62 are dispensed at the top of cartridge 15, pushed up by a spring 58 pushing on a plate 60. FIGS. 8B and 8D use a similar arrangement, with plate 60 being moved by a coil spring 59 to push samples 62 to the front of cartridge 15. FIG. 8B shows the sample removal aperture 61 at the top, and in 8D it is at the bottom.

Method of Operation

Figure 12A:
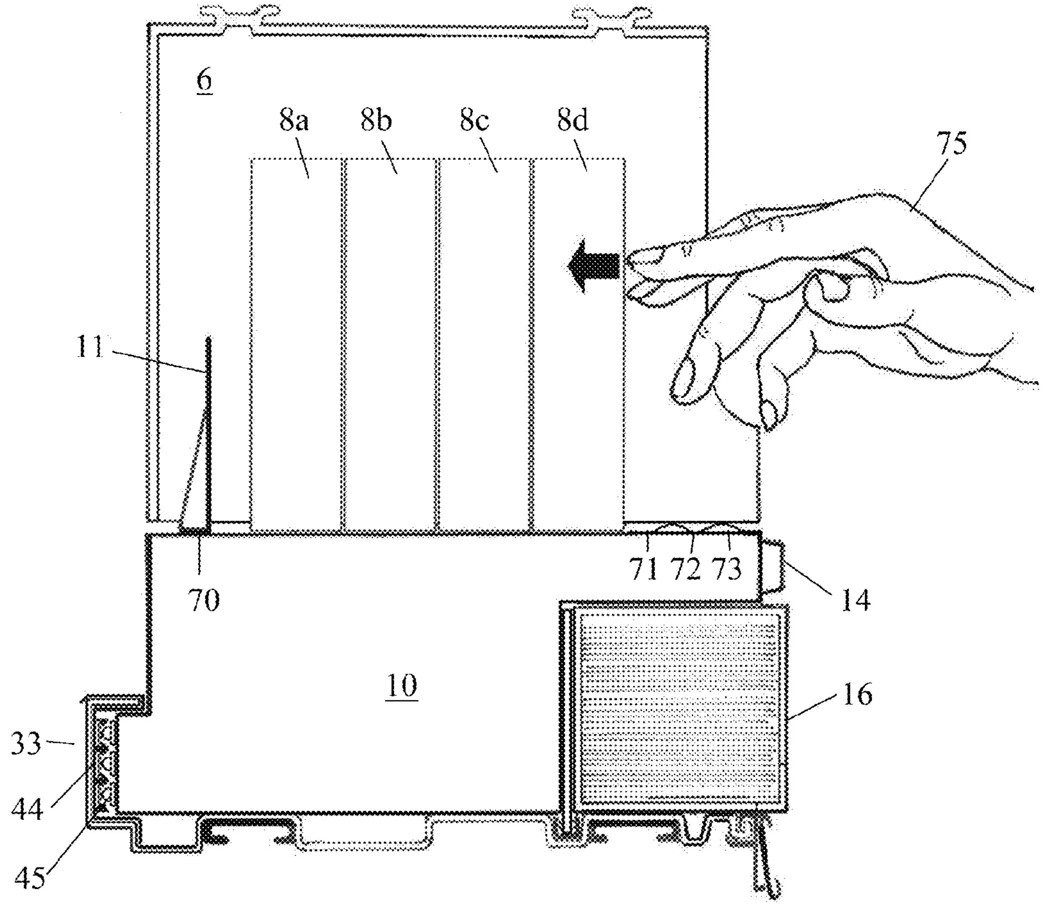
FIGS. 12A-12S show a side view of a module assembly as used in the steps in the method of the invention.
Figure 12B:
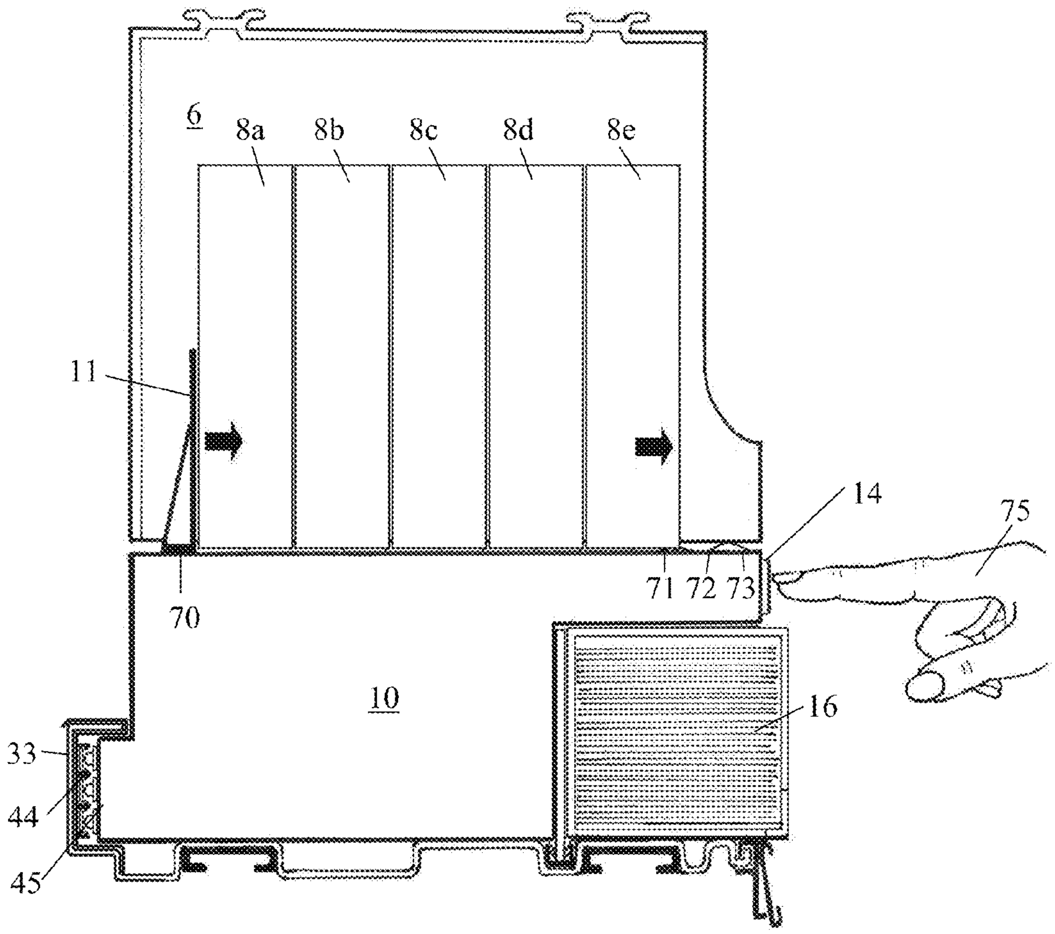
Figure 12C:
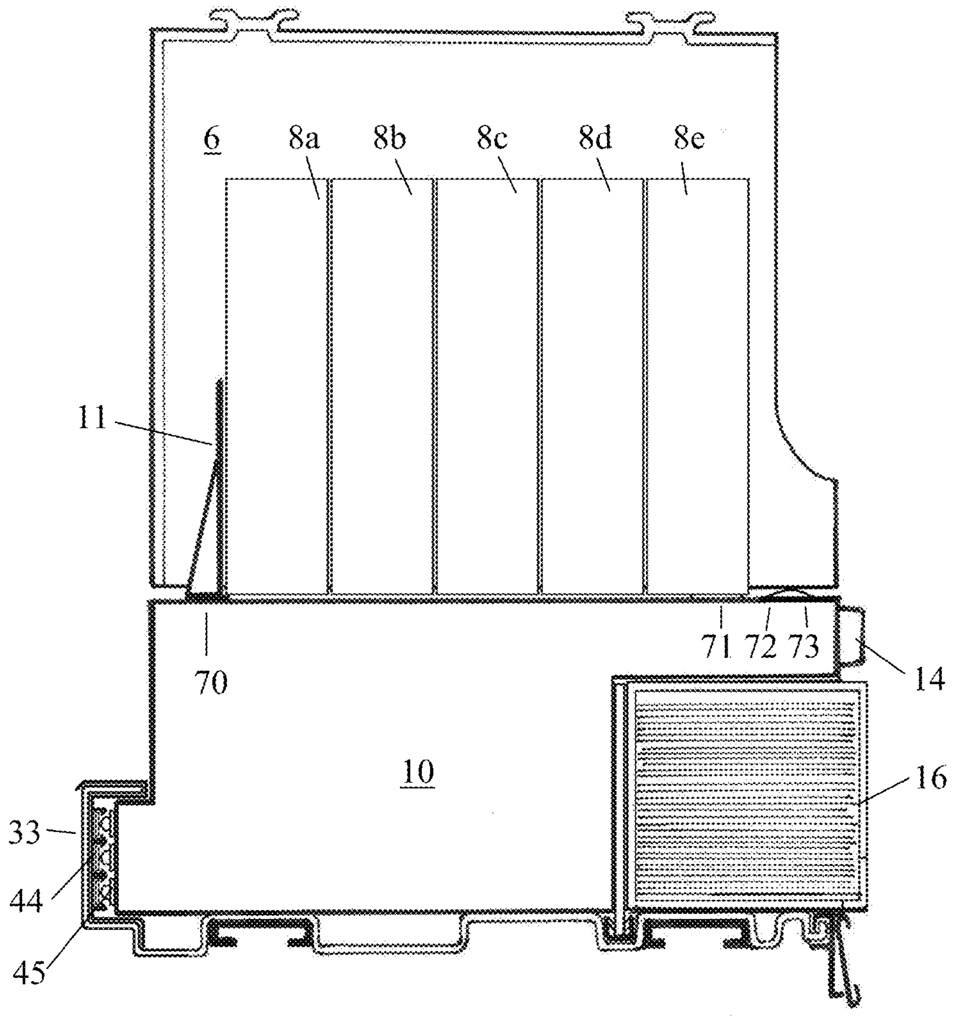
Figure 12D:
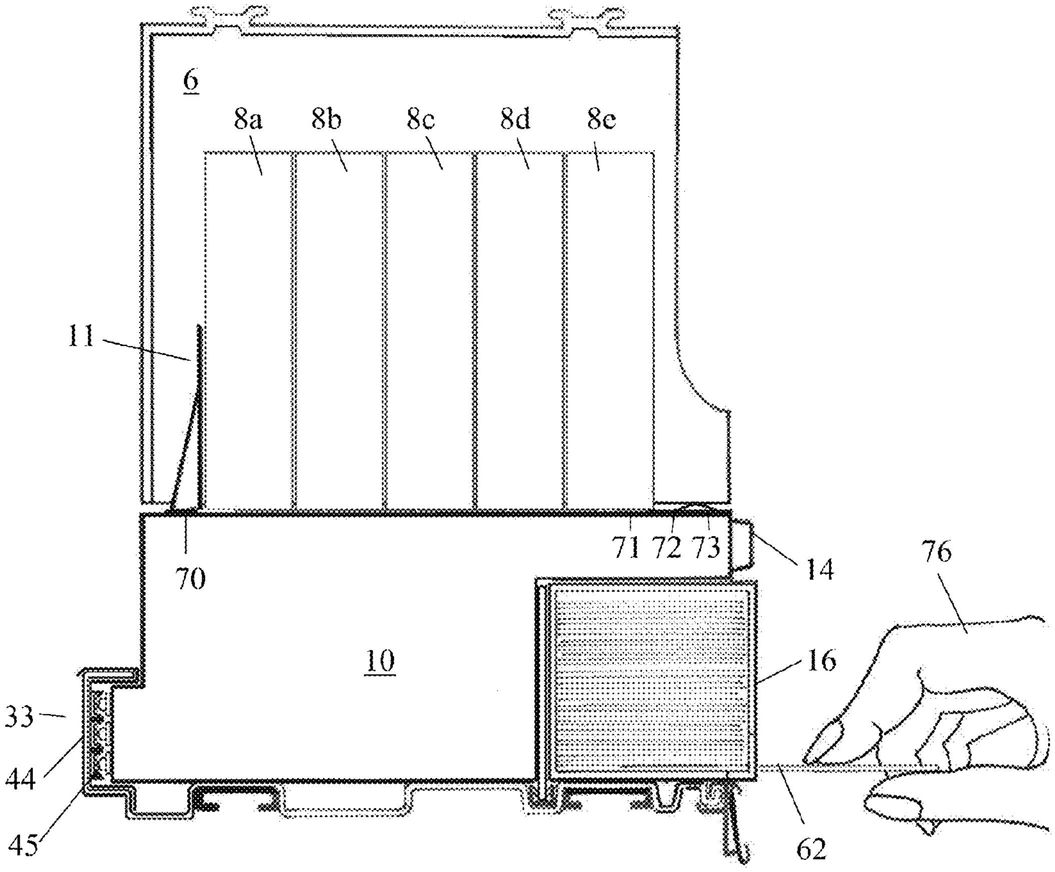
Figure 12E:
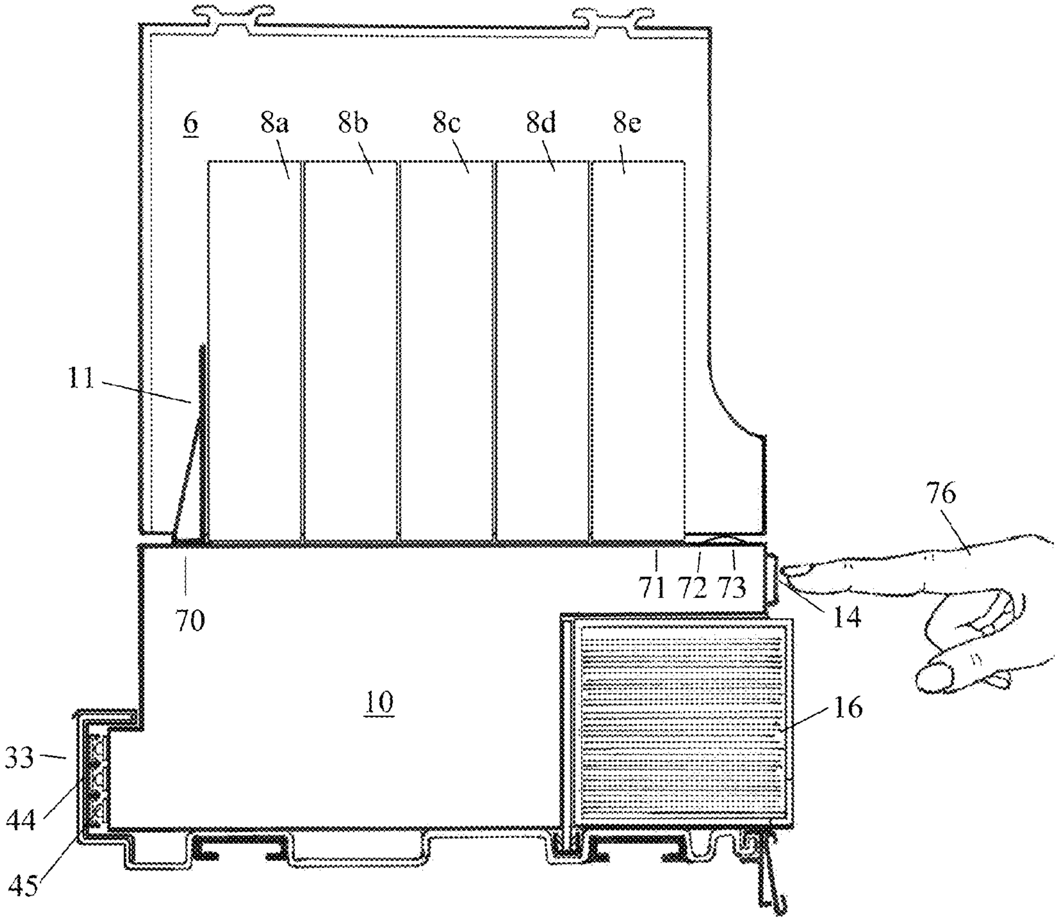
Figure 12F:
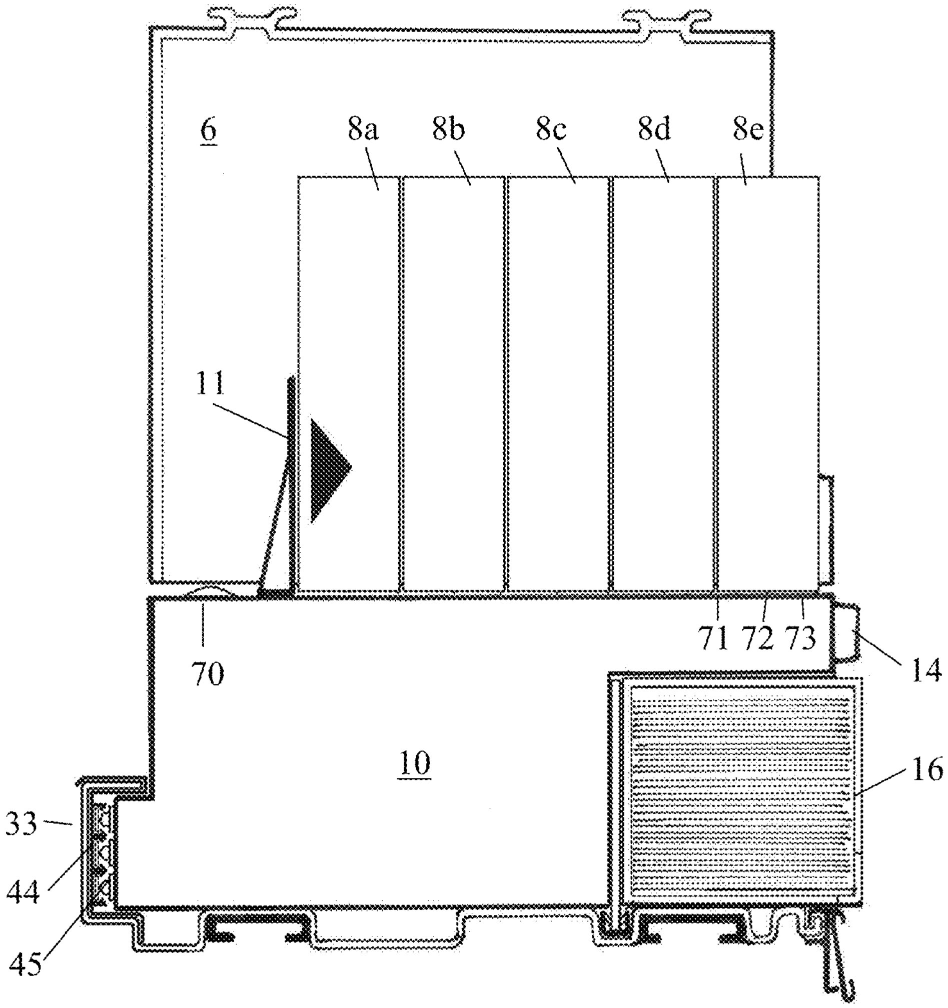
Figure 12G:
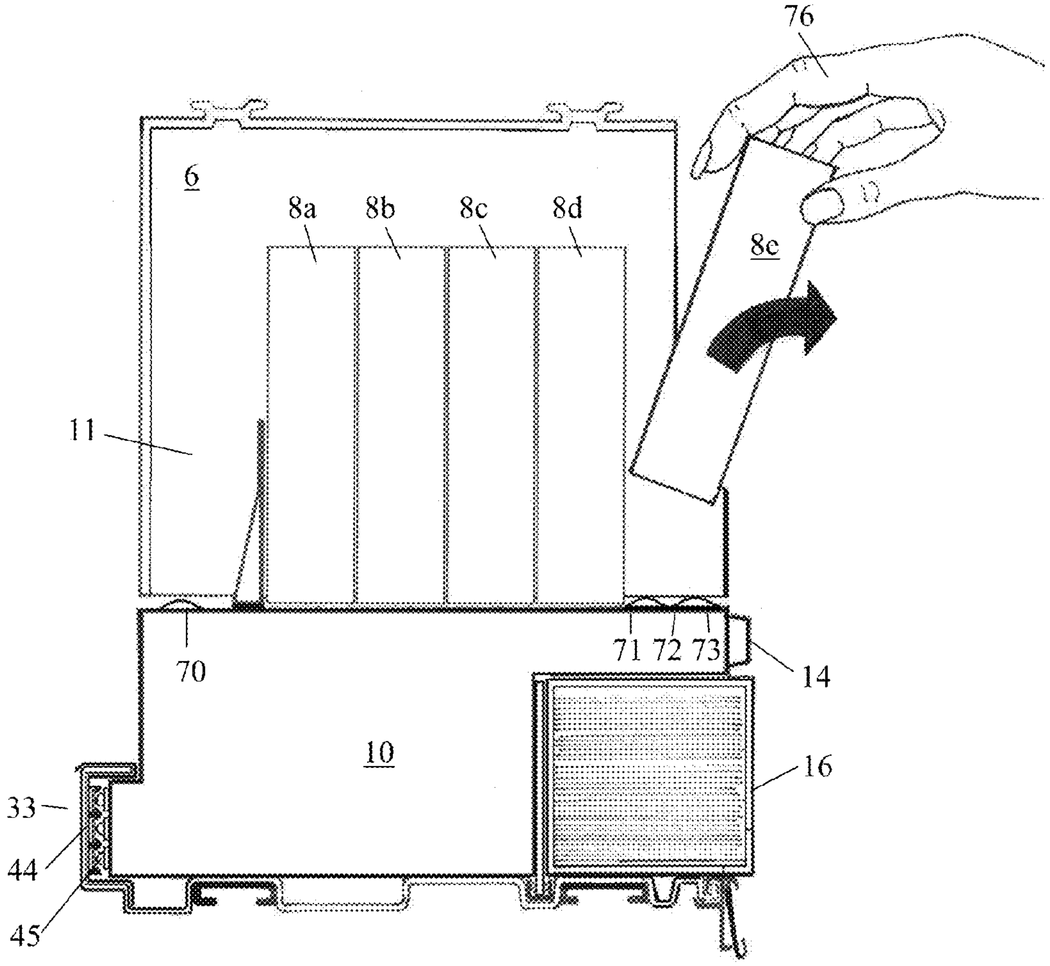
Figure 12H:
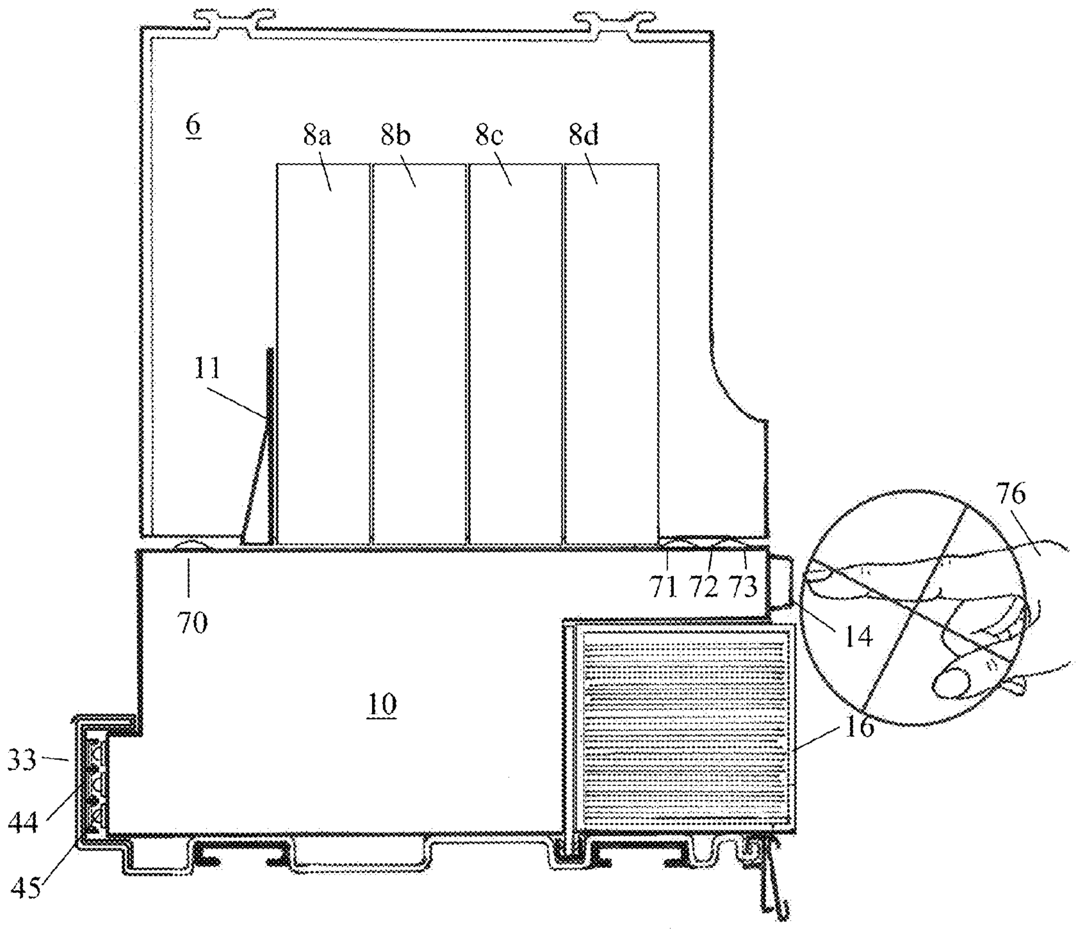
Figure 12I:
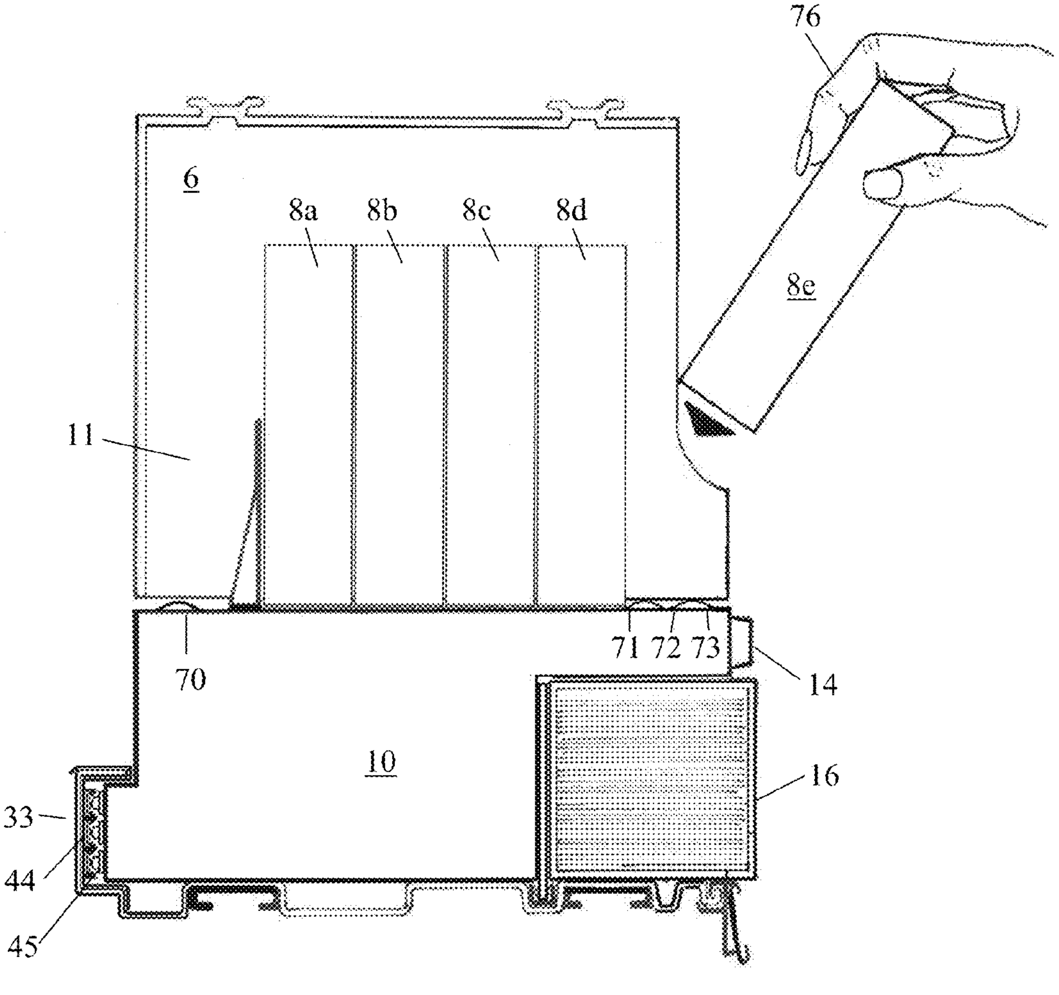
Figure 12J:
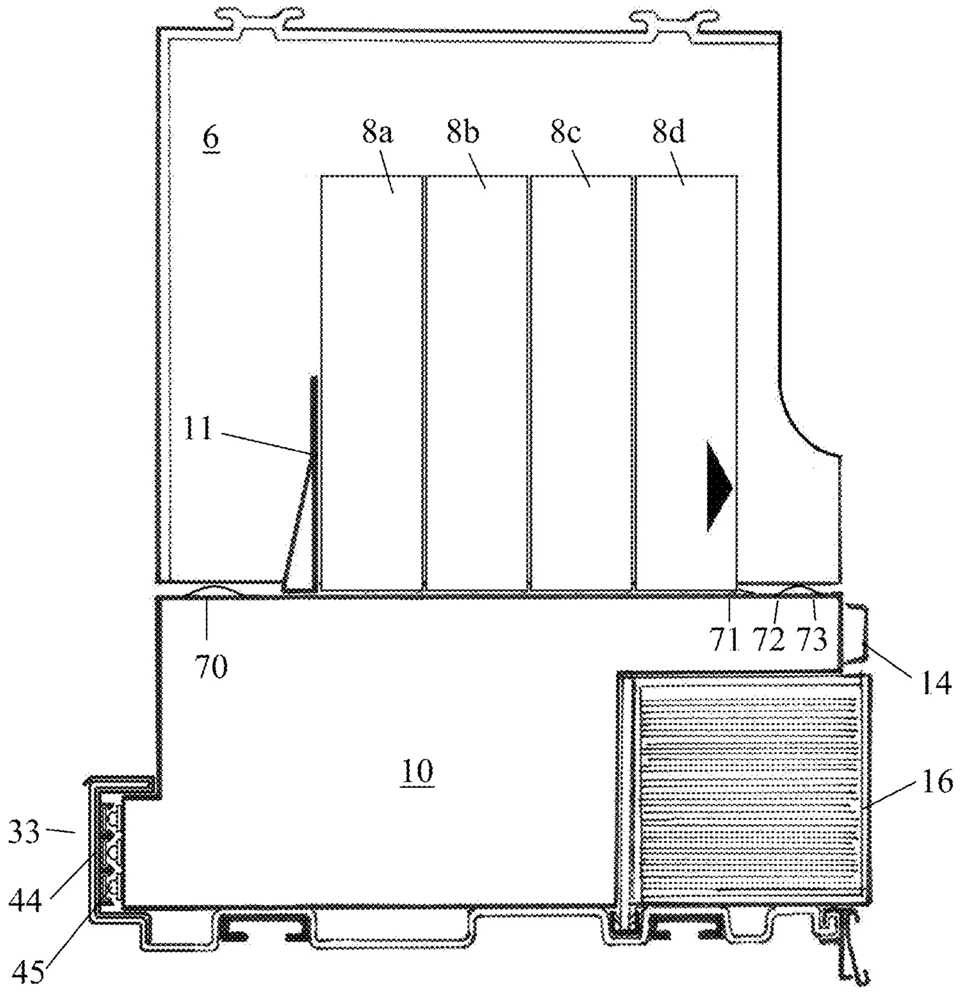
Figure 12K:
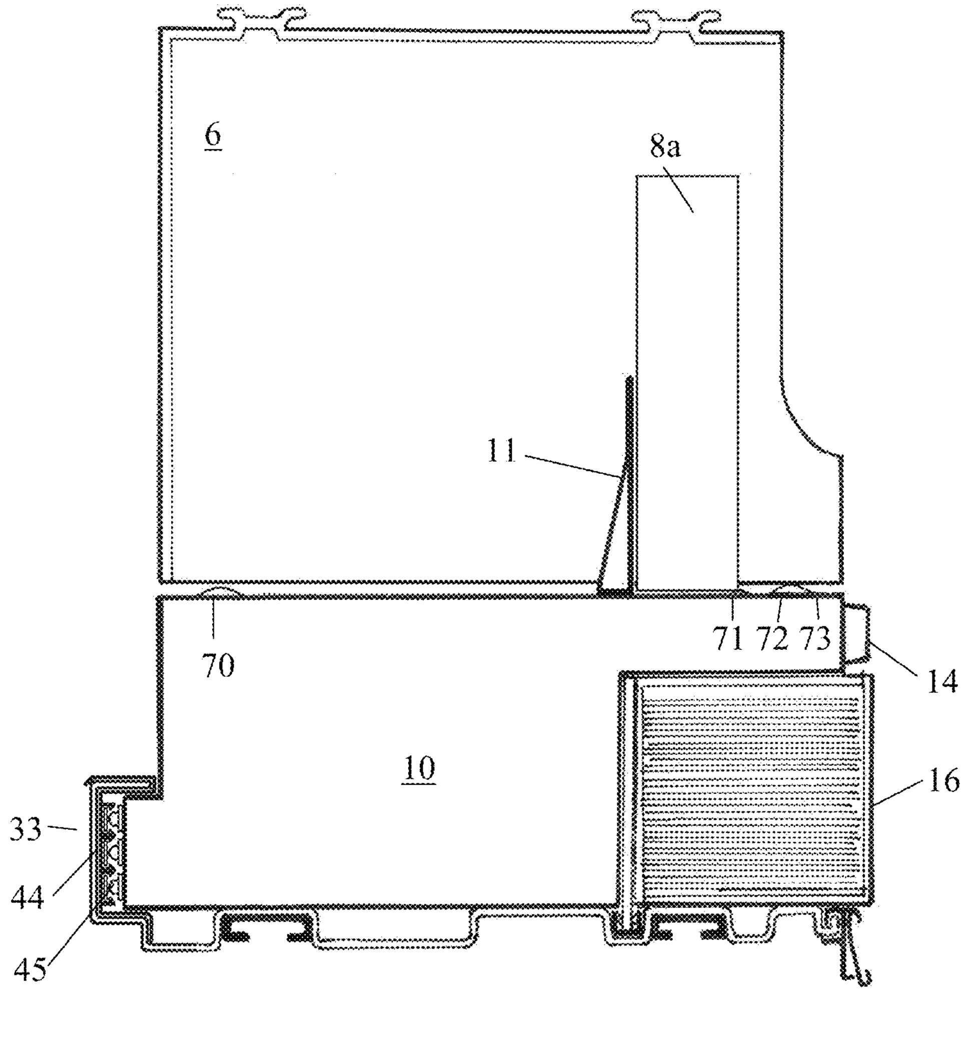
Figure 12L:
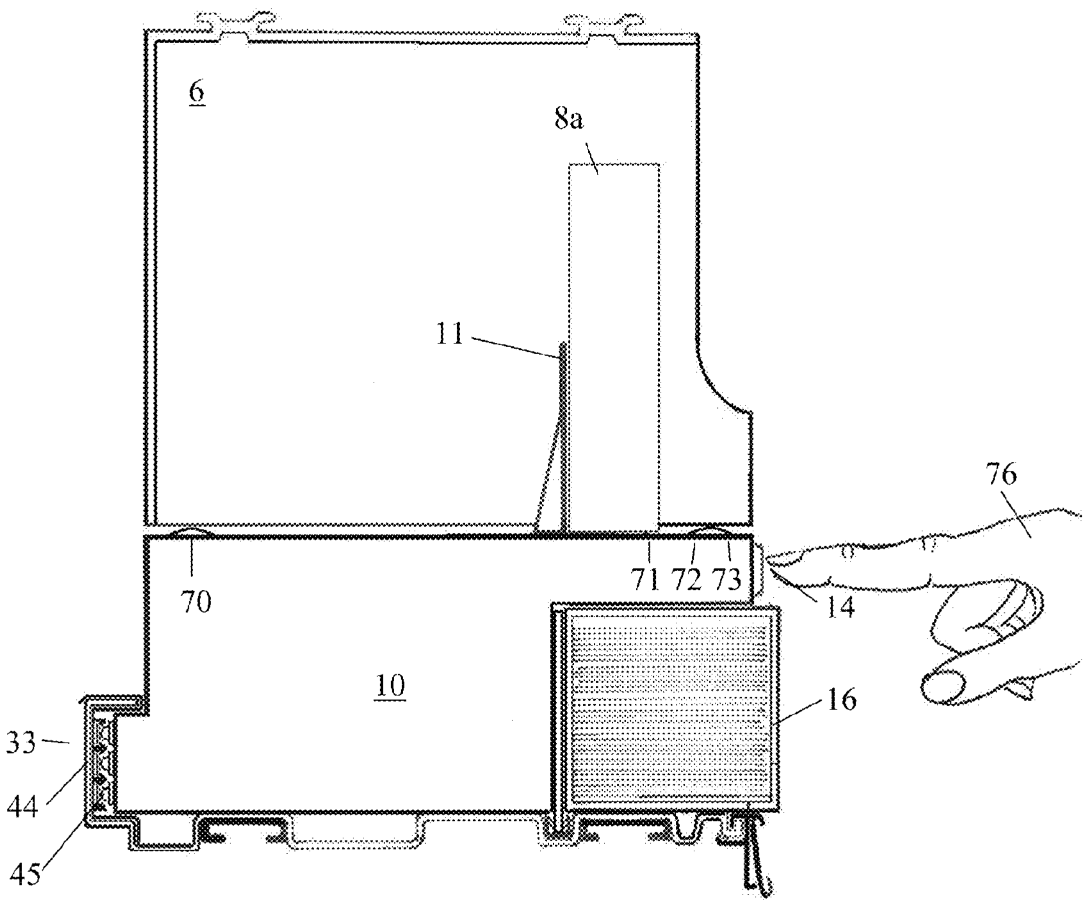
Figure 12M:
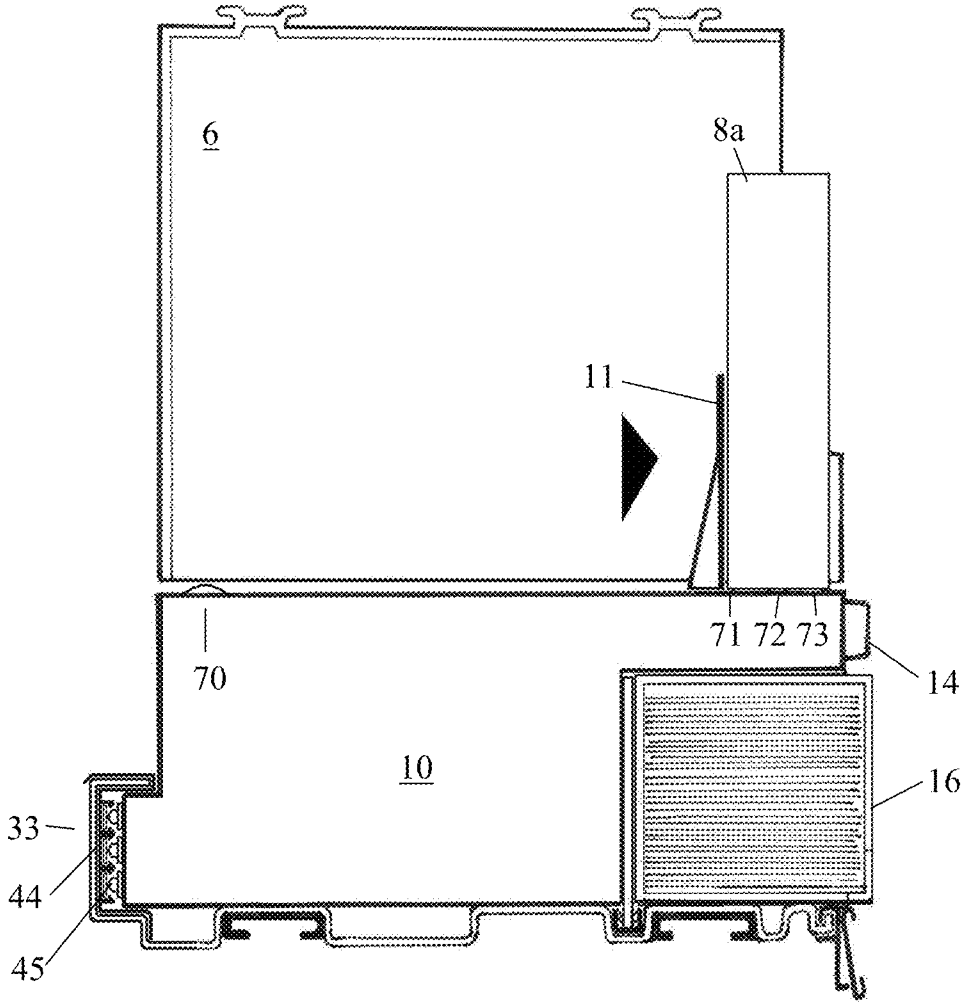
Figure 12N:
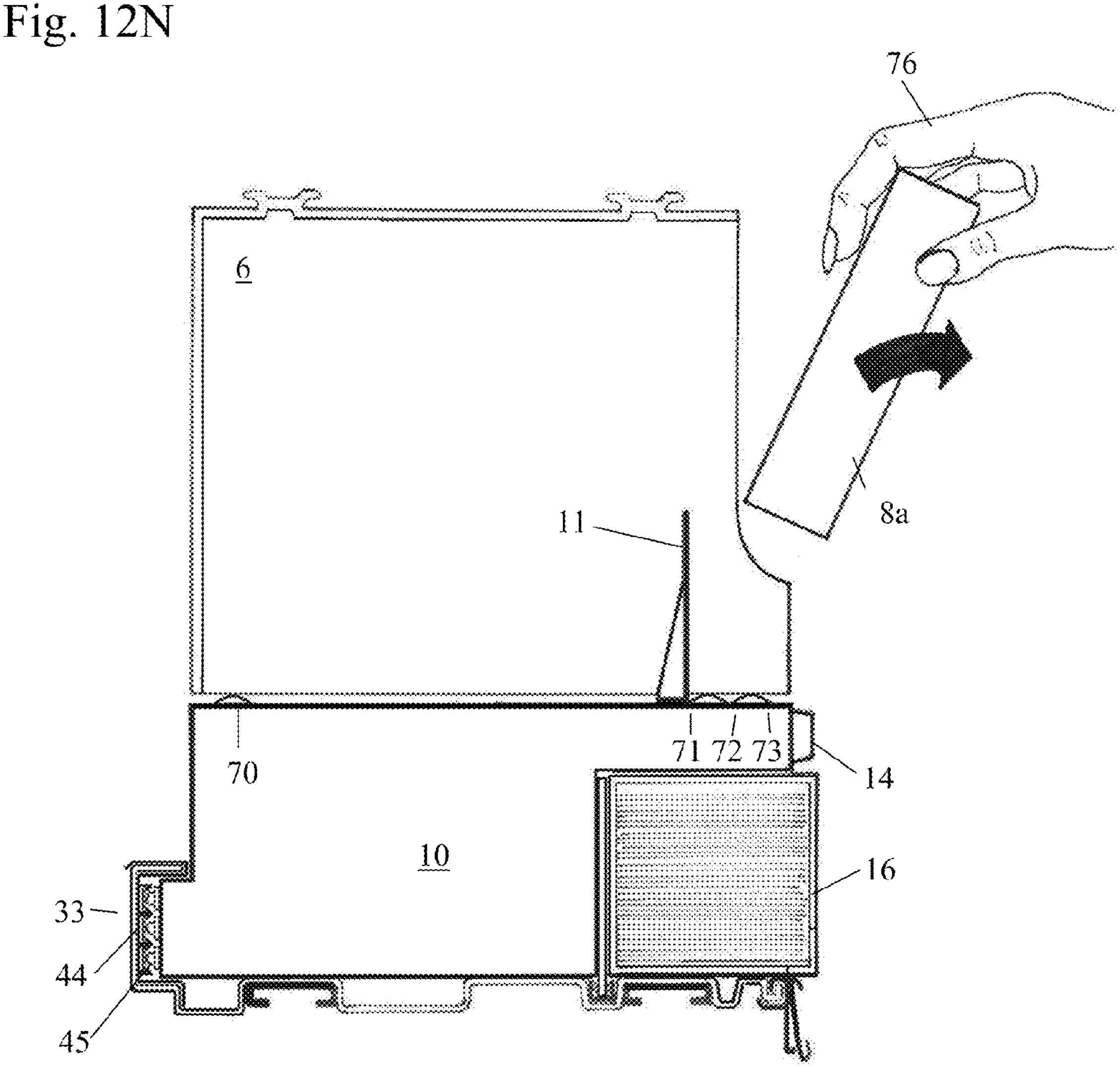
Figure 12O:
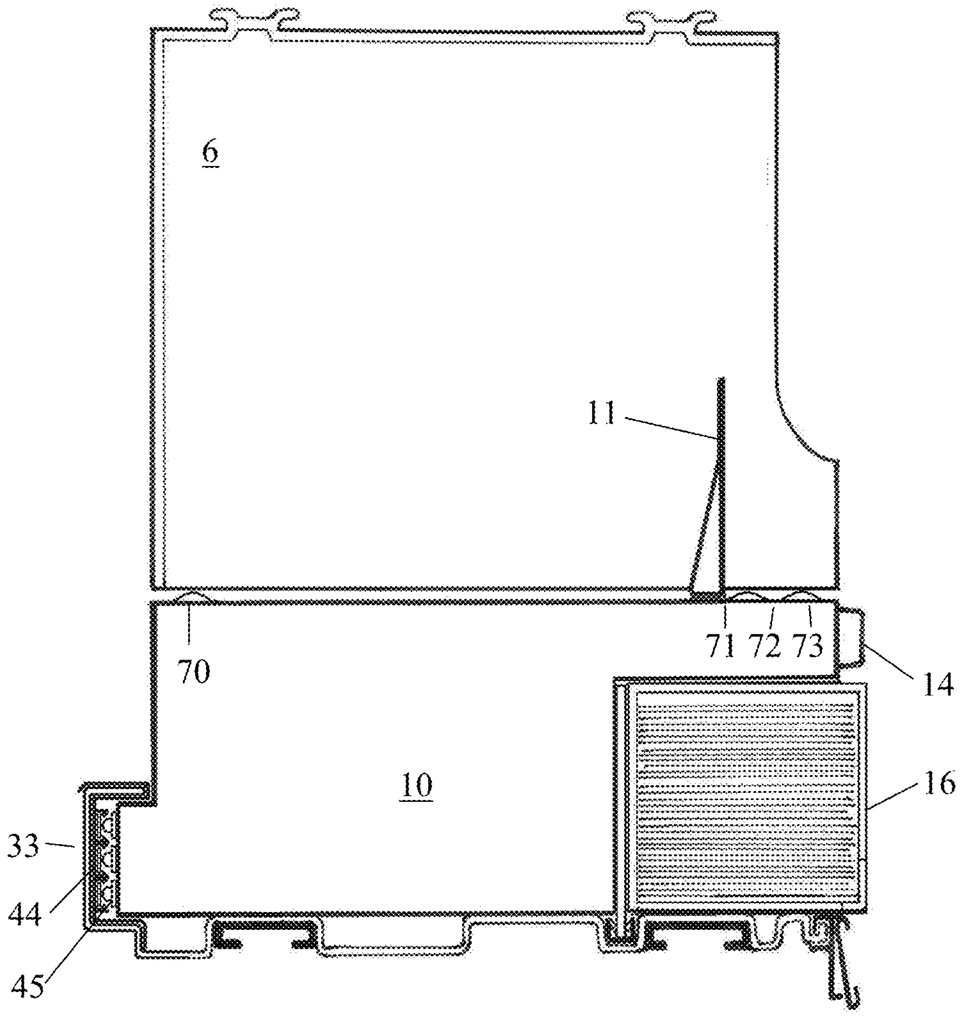
Figure 12P:
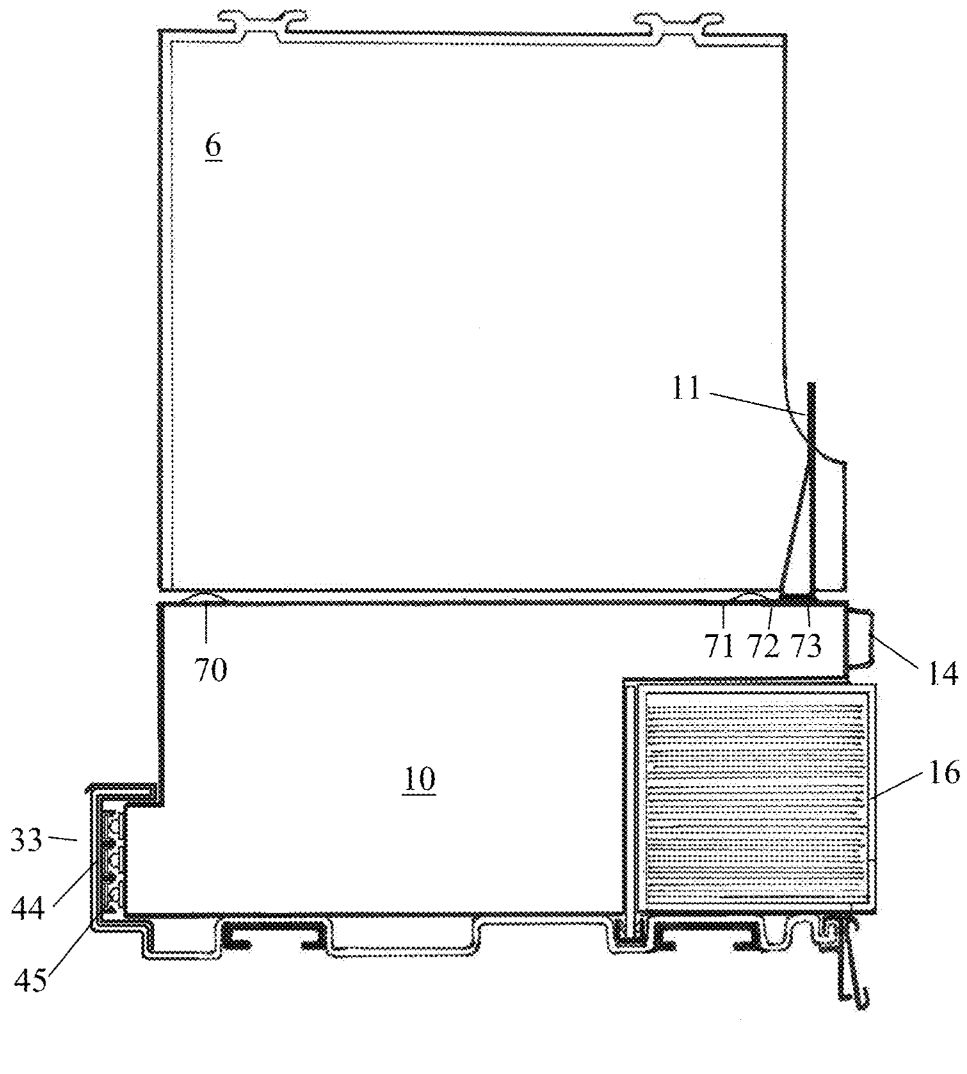
Figure 12Q:
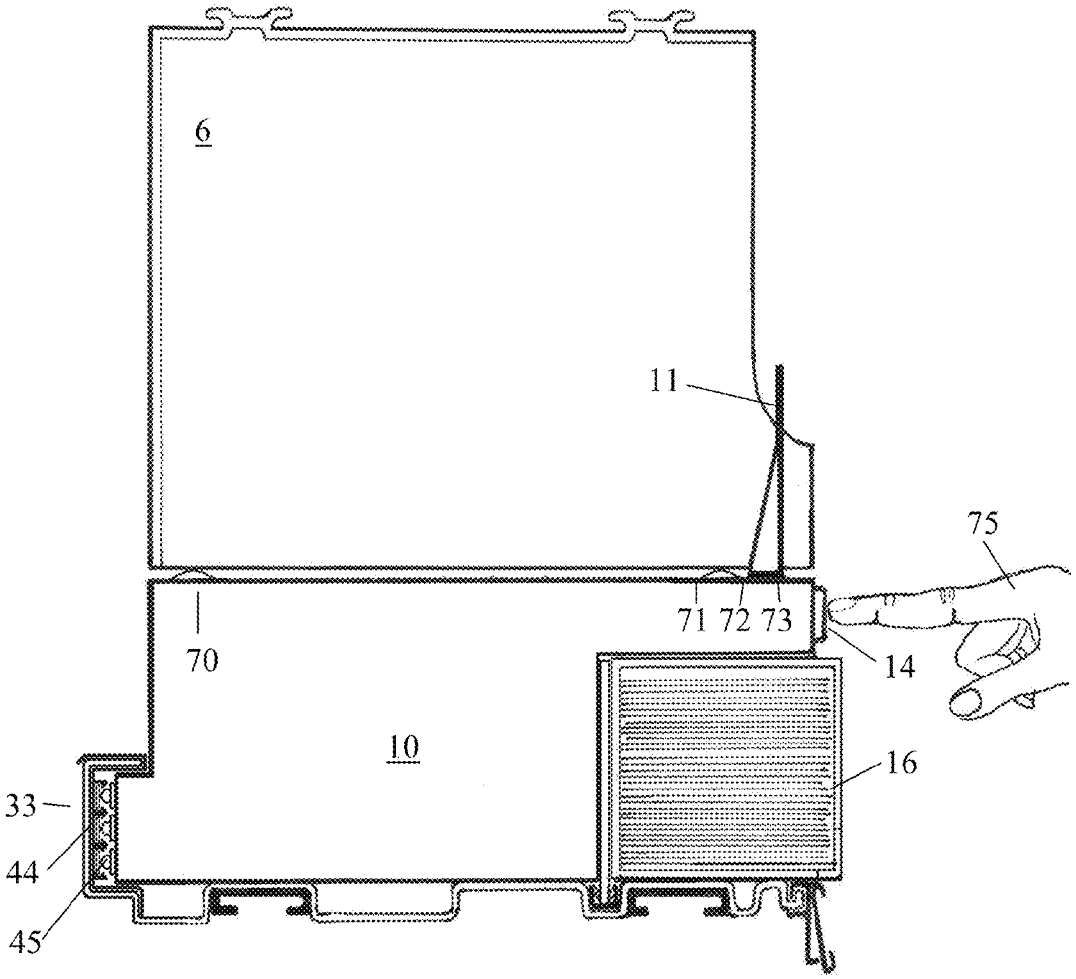
Figure 12R:
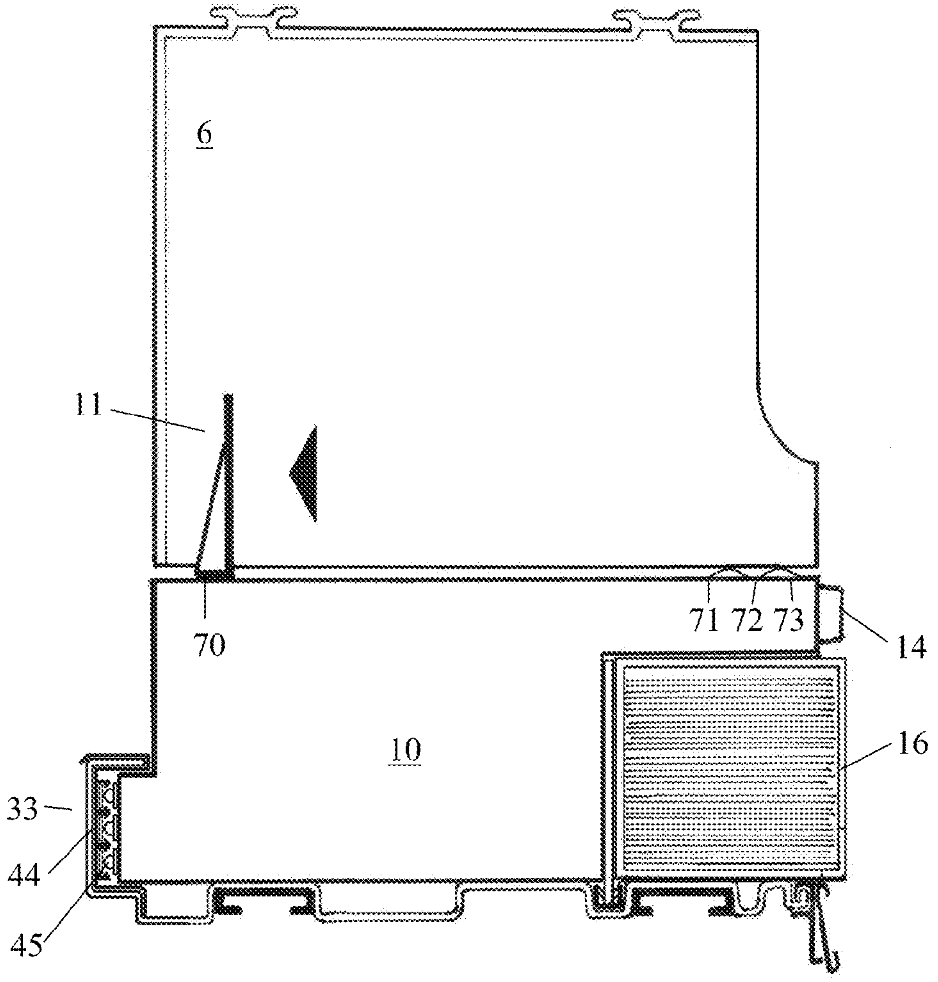
Figure 12S:
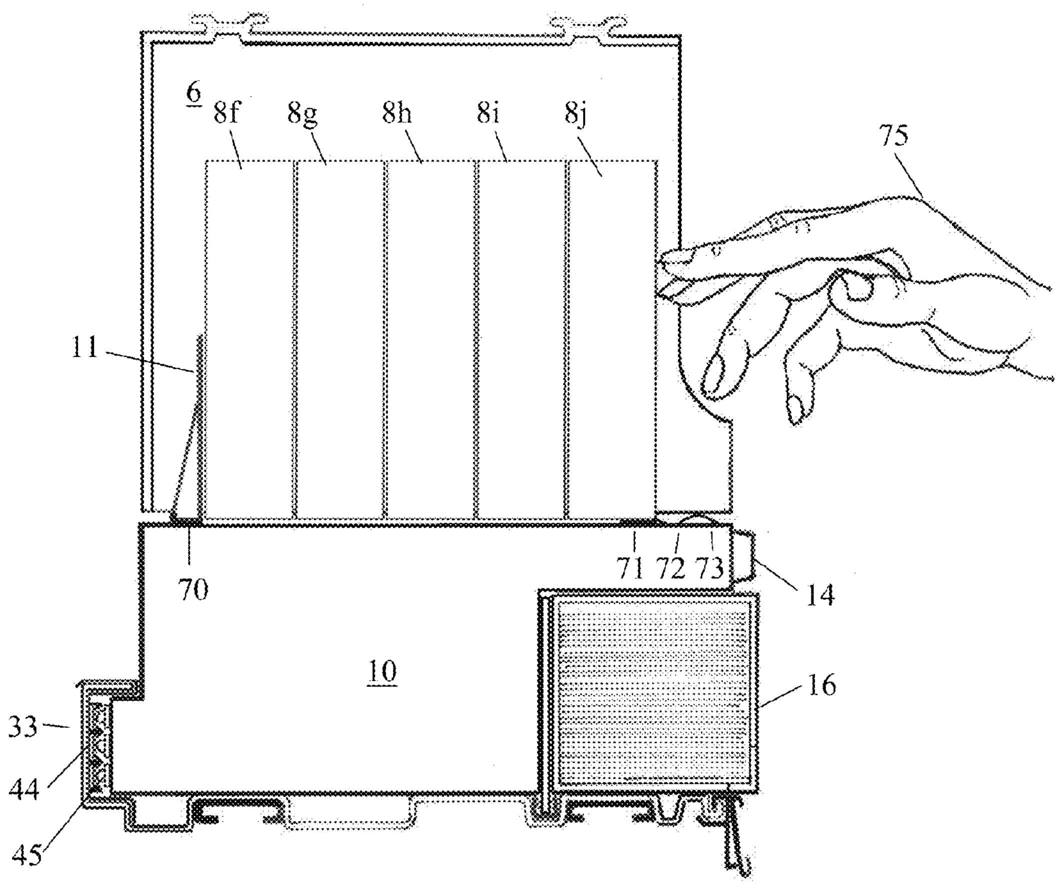

The method of the invention is shown in FIGS. 12A through 12S, which depict one module of the invention from initial stocking through sampling, vending and refilling operations.

In the following FIGS. 12A through 12S, four positions along the top surface of the module 10 will be discussed. Each position has a sensor 17, 18, 19 and 20 (see FIGS. 4 and 14), to sense the presence of the pusher 11 or a package 8 in the position. The positions are:

- "Rear" 70—the pusher 11 is at a rearward position, preferably at or near the rear of its travel, giving the maximum room for packages.
- "Queue" 71—the front-most package is aligned with the cut-back part 9 of the front edge of the row divider 6, such that the front of the package is visible, but the row divider 6 prevents the sides from being gripped by a shopper to remove the package from the module.
- "Selection" 72—the front-most package is moved far enough forward from the row dividers 6 that a shopper can grip the sides and remove the package from the module 10.
- "Empty" 73—there are no more packages, and the pusher 11 is all the way forward on the module 10.

FIG. 12A: Fill Module—With the pusher 11 at the rear position 70, in contact with sensor 17, a retail associate 75 fills the module 10 with as many packages as can be accommodated fully within the row dividers 6 (that is, without the packages extending beyond the queue position 71). Here, the module is shown during filling, with four packages 8*a*-8*d* already in place, with room for one more (8*e*, shown in the following figure). The row is considered full when no more packages can be added without extending into the selection position 72 where a customer might be able to grip the sides of the front-most package.

FIG. 12B: Queue up the packages—The retail associate 75 indicates to the conveyor module 10 that the row is full. This can be done by pushing the "push to buy" button 14, or, if equipped, pushing some other input. The conveyor module 10 activates the pusher 11 to push the row forward until sensor 18 senses that the front-most package 8*e* is in the queue position 71.

If needed, at this time the sampling module 16 can also be refilled. If equipped as shown in FIG. 4, this can be done by opening a pre-packed sample cartridge 15 and inserting it into module 16. If one of the other arrangements without cartridges 15 as shown in FIGS. 8A-8D is used, individual samples 62 or stacks of such samples can be put directly into sample module 16.

FIG. 12C: Ready—The module 10 is now ready for vending. The front-most package 8*e* is in the queue position 71. If so equipped, the lights 29 behind the "push to buy" button 14 may be lit, indicating the module 10 is ready to vend.

FIG. 12D: Sample—A customer 76 can try out the various scents of any of the fragrances in the system which interest him or her by removing a sample 62 from the sample module 16. If the system is used for vending other types of products, the samples 62 could be other things related to the products, such as specification or advertising documents for media players, purchase coupons, color swatches for nail polish or lipstick, sample photographs for cameras, etc.

In embodiments where the sampling method utilizes a packaged sample, a shopper tears open the sample package. The shopper can apply one or more selected fragrance samples to his or her skin and/or sniff the sample, as is known to the prior art. Where the samples occur in packages, a shopper can dispose of the used sample package(s) in the disposal module of the present invention (not shown) or in any other way.

A shopper may also take the selected sample(s) away for later review and return to make a purchase at a later time of their choosing FIG. 12E: Purchase—The customer 76 may decide to purchase one or more of the fragrances (or other products) housed in the system of the invention. He or she then pushes the "push to buy" button 14 on the module 10.

FIG. 12F: Vend—The conveyor module 10 advances the pusher 11 to move the row of packages 8*a*-8*e* forward until sensor 19 senses that package 8*e* is in the selection position 72.

FIG. 12G: Remove—The customer 76 may now remove the front-most package 8*e* from the selection location 72 by gripping the sides of the package 8*e* and pulling it up and forward, as shown.

FIG. 12H: Delay—In order to minimize the opportunity for pilferage, the "push to buy" button 14 on the module 10 is de-activated for a period of time. If so equipped, lights 29 in the button 14 can be turned off, indicating that the module 10 is not available.

Preferably, the conveyor module 10 simultaneously signals the other modules on the shelf assembly (preferably, all of the modules in the entire system) to de-activate their "push to buy" buttons as well. This prevents a would-be shoplifter from activating many modules and taking a large quantity of fragrance at a single time. A playful child is equally prevented from making multiple undesired actuations by pressing multiple buttons. As explained above, this can be done by grounding data line 31, or by other communication methods known to the art.

After the expiration of the period of time, the "push to buy" button 14 is re-activated and, if so equipped, lights 29 are turned back on.

A shopper may now either take their selected package to the store's front end cash wrap, to make their purchase, or they may begin again making additional selections and actuations as described above.

FIG. 12I: Return Delay—Preferably, for a selected return delay after the front-most package 8*e* has been advanced to the selection position 72 for removal, the pusher 11 remains in the same position it was when the front-most package 8*e* was moved into selection position 72. This gives the customer 76 time to change his or her mind and return the package to the row.

If such unwanted package 8*e* is returned to the selection position 72 during the return delay (or perhaps was never removed at all), at the expiration of the return delay, sensor 19 "senses" the package 8*e* in position 72. The controller 25 would then skip the next step, as advancing pusher 11 would advance packages out of the display and onto the floor.

FIG. 12J: Re-queue —After the expiration of the return delay, if sensor 19 does not detect a package in selection position 72, the controller 25 advances pusher 11 so that the front-most package, now 8*d*, is in queue position 71. The module is now ready for further operation, and the method can repeat from FIG. 12D or 12E.

FIG. 12K: Nearly Out of Stock—Eventually, only one package 8*a* remains, moved up into the queue position 71.

Optionally, this "nearly out of stock" condition could be sensed by the controller 25, and an indicator may be provided on the conveyor module to let a retail associate know that the module is nearly empty at this time. For example, lights 29 on the "push to buy" button 14 could be set to flash intermittently. Or, if so equipped, the controller 25 could send a signal through a bus 33 data line 31 to a remote monitoring facility. This "nearly out of stock" condition could be determined, for example, by detecting the pusher 11 position, if the product depth is known by the controller, and if an additional pusher sensor is provided to sense the presence of the pusher in the "one more package" position, or the amount of pusher advance is tracked. Alternatively, the controller 25 could count the number of vended packages—for this option the number of packages in a row would have to be known or input when the module is being stocked. Other means of determining the condition could be used within the teachings of the invention.

FIG. 12L: Buy Last Package—With only one package 8*a* left, a customer 76 activates the "push to buy" button 14 on the module 10. As in FIG. 12H this also starts the de-activation delay—refer to the description of FIG. 12H, above, for details of the delay and lockout procedures, which are incorporated by reference here.

FIG. 12M: Last Vend—The last package 8*a* is advanced to the selection position 72.

FIG. 12N: Take the last package—The customer 76 removes the last package 8*a*.

FIG. 12O: Empty—Module 10 is now empty. Once again, the controller 25 implements the return delay, as in step 12I, just in case the customer 76 decides to return the package 8*a*.

FIG. 12P: Move up pusher—At the expiration of the return delay, the controller 25 moves pusher 11 forward until sensor 20 detects that the pusher 11 is in the empty position 73, fully forward. If so equipped, the lights 29 may be turned off, indicating that the module is not available, or might be set to flash, indicating the module needs to be refilled. An "empty" label could be provided on the pusher 11 to give a simple indication to customers and retail associates, as well. If desired, this label could be coded with the UPC or other barcode for the item, for a retail associate to scan with a code reader to order or select new stock. If so equipped, the controller 25 could send a signal through a bus 33 data line 31 to a remote monitoring facility, indicating that the module is now completely empty.

FIG. 12Q: Start Refill—The conveyor module 10 accepts a refill indication. Preferably, this would comprise the retail associate 75 pushing the "push to buy" button 14 of the row to be refilled and holding it down for a selected period of time. This time is preferably programmed to a longer-thannormal time (7 seconds, for example), so as to easily differentiate between the "refill" indication and the customer's "buy" momentary push of the button.

FIG. 12R: Reset Pusher—The controller 25 moves the pusher 11 rearward until sensor 17 indicates it is in rear position 70. The module 10 is now ready to be refilled with additional packages.

FIG. 12S: Refill—As described in FIG. 12A, above, packages *8f-8j* are pushed into the row and rearward by the stocking associate 75, until they contact the pusher plate and fill or partially fill the row.

The method now repeats from FIG. 12B.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of vending product packages using a plurality of modules for vending a plurality of product packages, the packages being housed in an enclosed row such that only a single front most package in the row can be removed by a shopper when it is advanced to an at least partially unenclosed selection position within the row, all other packages in the row remaining enclosed such that the remaining packages cannot be removed by the shopper, the module comprising a selection input, a pusher for moving the product packages in the enclosed row, and a rear position sensor for sensing when the pusher is in a rearward position, the plurality of modules being coupled together by a data bus comprising at least a data line for communication between modules, the method comprising:

a) accepting an indication on the selection input that the shopper wishes to remove a package;

b) advancing the row of packages forward by moving a pusher until a package is in the at least partially unenclosed selection position within the row, allowing removal of the package which has been advanced to the selection position;

c) de-activating the selection input for a delay period starting simultaneous with or immediately after the advancing step (b), and extending for a period of time after the ending of the advancing step (b) and initiating a condition on the data line during the delay period, such that no further packages can be advanced to the selection position from any of the plurality of modules during the delay period;

d) activating the selection input after the delay period;

e) repeating the method from step (a) until no more packages remain in the row;

f) accepting a refill indication; and g) retracting the pusher rearwardly, until the rear position sensor senses that the pusher is in the rearward position, such that additional packages may be inserted into the row from a front of the module.

2. The method of claim 1, further comprising the step of providing a sample for a shopper to select.

3. The method of claim 2, in which the sample is provided in a sample module in the module for vending.

4. The method of claim 1, in which the module further comprises a selection position sensor adjacent to the selection position for sensing a presence of a package in the selection position, and the advancing step (b) advances the packages until a package is sensed by the selection position sensor.

5. The method of claim 1, in which the module further comprises a selection position sensor adjacent to the selection position for sensing a presence of a package in the selection position, and the activating step (d) only activates the selection input if no package is sensed in the selection position.

6. The method of claim 1, in which the module further comprises a queue position sensor for sensing a package is in a queue position, the queue position being such that a package in the queue position is at a forward position in the enclosed row, but not far enough forward for the package to be grasped by a shopper, and the method further comprises, after the delay period of step (c), advancing the row of packages forward until the queue position sensor senses a package is in the queue position.

7. The method of claim 1, further comprising the steps of:

after retracting the pusher, accepting an indication on the selection input; and advancing the pusher until a first package is adjacent to, but not in, the selection position.

8. The method of claim 1, in which the refill indication comprises activating the selection input for a selected period of time.

9. The method of claim 1, further comprising each module monitoring the data line and, while the condition is detected on the data line, de-activating the selection input, such that no packages can be removed during the delay period.

10. A product package vending system comprising a plurality of modules coupled together by at least one data line, each module comprising:

a conveyor module having a front and a rear and a top surface for supporting a plurality of product packages arranged in a row, comprising:

a pusher on the top surface of the conveyor module, movable from a rear position adjacent to the rear of the conveyor module to an empty position adjacent to the front of the conveyor module, for moving the row of product packages along the top surface of the conveyor;

a controller coupled to the pusher and coupled to the data line;

a selection input coupled to the controller; and a pair of row dividers and a roof, located over the conveyor module, forming an enclosure for the plurality of packages in a row, the row dividers and roof being arranged such that when a row of product packages is in the enclosure, with the package closest to the front of the conveyor module being in a selection position, only the package in the selection position can be removed by a shopper, all other packages in the row remaining enclosed and unavailable for removal by the shopper;

such that when the selection input is activated, the controller causes the pusher to move toward the front of the conveyor module, advancing the row of packages until a package is in the selection position, allowing removal of the package;

the controller in each of the plurality of modules being programmed such that a condition is indicated on the data line for a delay period starting simultaneous with or immediately after the controller causing the pusher to move, and extending for a period of time after the package is in the selection position; and the controller in at least one module of the plurality of modules being programmed such that the pusher in the module is not moved while a condition is detected on the data line.

11. A method of vending product packages using at least one module for vending a plurality of product packages, the packages being housed in an enclosed row such that only a single front most package in the row can be removed by a shopper when it is advanced to an at least partially unenclosed selection position within the row, all other packages in the row remaining enclosed such that the remaining packages cannot be removed by the shopper, the module comprising a selection input, a pusher for moving the product packages in the enclosed row, and a queue position sensor for sensing a package is in a queue position, the queue position being such that a package in the queue position is at a forward position in the enclosed row, but not far enough forward for the package to be grasped by a shopper, the method comprising:

a) accepting an indication on the selection input that the shopper wishes to remove a package;

b) advancing the row of packages forward by moving a pusher until a package is in the at least partially unenclosed selection position within the row, allowing removal of the package which has been advanced to the selection position;

c) de-activating the selection input for a delay period starting simultaneous with or immediately after the advancing step (b), and extending for a period of time after the ending of the advancing step (b), such that no further packages can be advanced to the selection position during the delay period;

d) after the delay period of step (c), advancing the row of packages forward until the queue position sensor senses a package is in the queue position;

e) after the delay period of step (c), activating the selection input; and f) repeating the method from step (a) until no more packages remain in the row.

12. The method of claim 11, further comprising the step of providing a sample for a shopper to select.

13. The method of claim 12, in which the sample is provided in a sample module in the module for vending.

14. The method of claim 11, in which the module further comprises a selection position sensor adjacent to the selection position for sensing a presence of a package in the selection position, and the advancing step (b) advances the packages until a package is sensed by the selection position sensor.

15. The method of claim 11, in which the module further comprises a selection position sensor adjacent to the selection position for sensing a presence of a package in the selection position, and the activating step (e) only activates the selection input if no package is sensed in the selection position.

16. The method of claim 11, further comprising the steps of:

accepting a refill indication; and retracting the pusher rearwardly, such that additional packages may be inserted into the row from a front of the module.

17. The method of claim 16, in which the module further comprises a rear position sensor for sensing when the pusher is in a rearward position, and the retracting step comprises moving the pusher rearwardly until the rear position sensor senses that the pusher is in the rearward position.

18. The method of claim 16, further comprising the steps of:

after retracting the pusher, accepting an indication on the selection input; and advancing the pusher until a first package is adjacent to, but not in, the selection position.

19. The method of claim 16, in which the refill indication comprises activating the selection input for a selected period of time.

* * * * *